(12) United States Patent
Greenan et al.

(10) Patent No.: US 10,027,766 B2
(45) Date of Patent: Jul. 17, 2018

(54) ACCESSING MULTIPLE CONTENT STORAGE FACILITIES USING SOURCE-AWARE STORAGE POLICIES

(71) Applicant: Box, Inc., Los Altos, CA (US)

(72) Inventors: Kevin M. Greenan, Santa Cruz, CA (US); Antoine Boulanger, San Francisco, CA (US); Sam Ghods, San Francisco, CA (US); Jeffrey R. Queisser, San Francisco, CA (US); Shi Xu, Cupertino, CA (US)

(73) Assignee: Box, Inc., Redwood City, CA (US)

(*) Notice: Subject to any disclaimer, the term of this patent is extended or adjusted under 35 U.S.C. 154(b) by 210 days.

(21) Appl. No.: 14/727,777

(22) Filed: Jun. 1, 2015

(65) Prior Publication Data
US 2016/0191635 A1    Jun. 30, 2016

Related U.S. Application Data

(60) Provisional application No. 62/007,101, filed on Jun. 3, 2014.

(51) Int. Cl.
*H04L 29/08* (2006.01)
*G06F 9/445* (2018.01)

(52) U.S. Cl.
CPC ........ *H04L 67/16* (2013.01); *G06F 9/44505* (2013.01); *H04L 67/1097* (2013.01)

(58) Field of Classification Search
CPC ........ G06F 17/30088; G06F 17/30082; G06F 17/30864; G06F 17/30575; G06F 9/44505; G06F 9/44565; G06F 17/30; H04L 67/16; H04L 67/1097
See application file for complete search history.

(56) References Cited

U.S. PATENT DOCUMENTS

| | | | | |
|---|---|---|---|---|
| 2010/0332401 A1* | 12/2010 | Prahlad | ................. | G06F 17/302 711/162 |
| 2013/0138649 A1* | 5/2013 | Broberg | ............ | G06F 17/30215 707/736 |
| 2015/0199367 A1* | 7/2015 | Hammer | ........... | G06F 17/30085 707/654 |

OTHER PUBLICATIONS

"EMC VIPR Controller: Automate and Simplify Storage Management Datasheet", Jan. 2015.

* cited by examiner

*Primary Examiner* — Anh Ly
(74) *Attorney, Agent, or Firm* — Vista IP Law Group, LLP

(57) ABSTRACT

Systems for cloud-based storage systems. Embodiments commence upon deploying a server in a cloud-based environment, such that the server is configured to interface with one or more storage facilities that are accessible over a network by the server to provide cloud-based storage services in response to a storage command originating from a user terminal. The deployed server is connected to the network such that the server receives storage commands that pertain to one or more source objects that are associated with a set of source attributes. A policy manager applies one or more source-aware storage policies by determining a set of storage policies based at least in part on the one or more associated source attributes. The policy manager accesses a routing table of target storage locations and, in accordance with the source-aware policies, sends source objects over the network to one or more of the target storage locations.

20 Claims, 16 Drawing Sheets

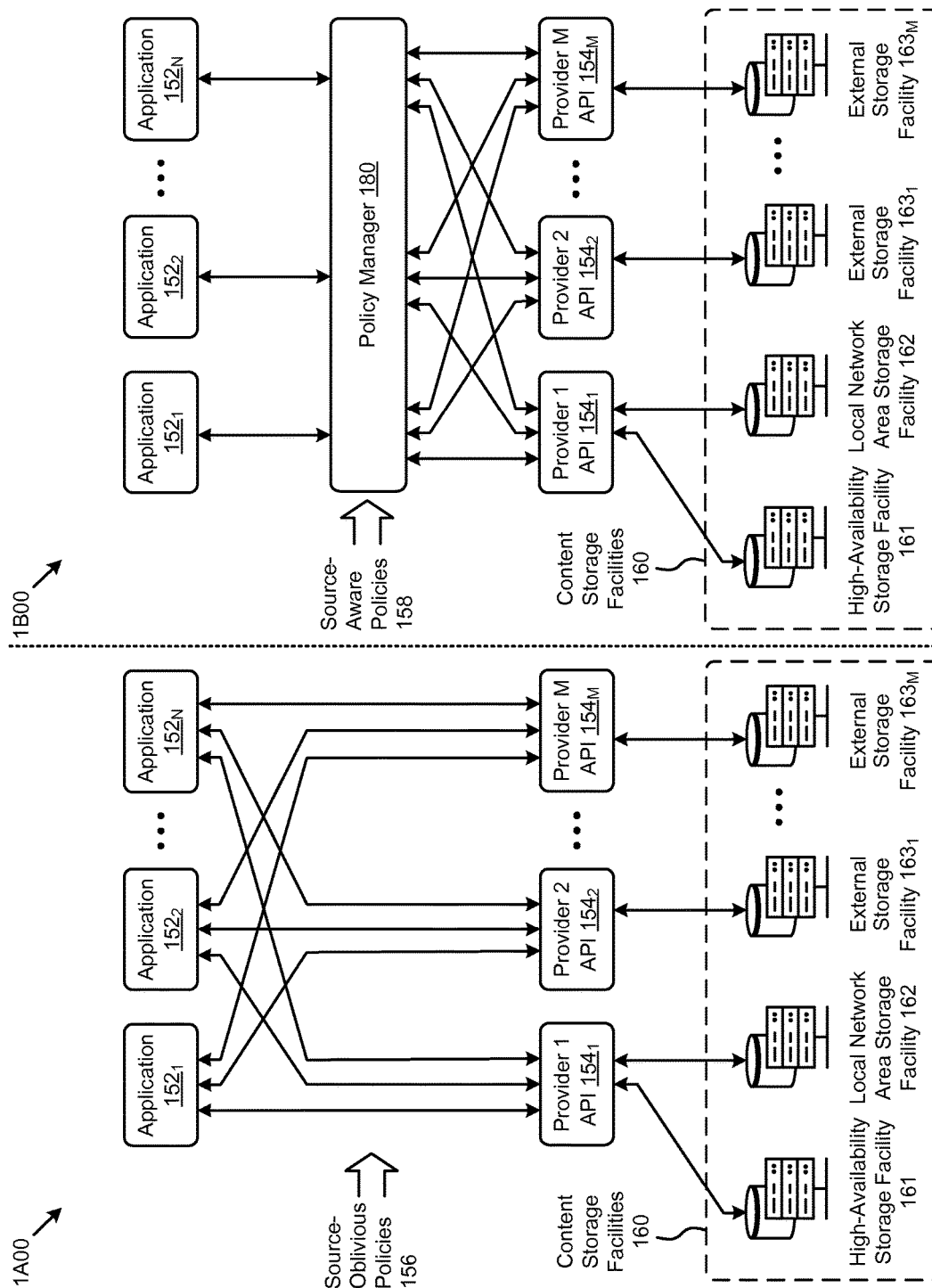

ACCESSING MULTIPLE CONTENT STORAGE FACILITIES USING SOURCE-AWARE STORAGE POLICIES

RELATED APPLICATIONS

The present application claims the benefit of U.S. Provisional Application Ser. No. 62/007,101, titled "POLICY-BASED FLEXIBLE STORAGE ROUTING ARCHITECTURE IN A CLOUD COLLABORATION PLATFORM", filed Jun. 3, 2014, which is hereby incorporated by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

This disclosure relates to the field of cloud-based storage systems, and more particularly to techniques for accessing multiple content storage facilities using source-aware storage policies.

BACKGROUND

The proliferation of cloud-based services and platforms continues to increase. Specifically, cloud-based storage systems have impacted the way personal and corporate information (e.g., content) are stored, and has also impacted the way personal and corporate information are shared and managed. One benefit of using a cloud-based storage service is efficient use of electronic content storage facilities and computing resources for storing digital content (e.g., "files"). For example, a cloud-based storage service might store content from a client in Europe in a storage facility in Europe, yet the same cloud-based storage service might also store content from a client in the U.S. in a storage facility in the U.S. Where and how content is stored and accessed is specified in part by storage policies defined by various stakeholders in the cloud-based storage ecosystem (e.g., the client, the cloud-based storage service provider, the storage facility provider, etc.) based on various policy objectives (e.g., security, accessibility, loss protection, cost, etc.). These stakeholders desire to have storage policy flexibility in order to continually meet or exceed changing objectives.

As the number of content storage facility options and complexity of policy objectives increase, however, maintaining the desired storage policy flexibility can be difficult. Some legacy approaches provide to clients an application programming interface (e.g., "API") for each available storage facility. Such legacy approaches require that the client determine a priori the target storage facility and develop facility-specific storage commands and policies. These approaches also do not consider varying source attributes (e.g., client location, enterprise service level agreement or "SLA", enterprise tariffs, etc.) when determining storage policies to apply. Further, such approaches result in large, customized programming code bases that are difficult to maintain (e.g., update as physical storage components are changed). Other legacy approaches provide to clients a translation of storage commands targeted for one storage facility to storage commands for another storage facility. This approach is also based on facility-specific commands and policies, and fails to consider source attributes when applying such policies.

The problem to be solved is therefore rooted in technological limitations of the legacy approaches. Improved techniques, in particular improved application of technology, are needed to address the problem of using various cloud-based content storage facilities with facility-agnostic and source-aware commands and policies. More specifically, the technologies applied in the aforementioned legacy approaches fail to achieve sought-after capabilities of the herein disclosed techniques for accessing multiple content storage facilities using source-aware storage policies. What is needed is a technique or techniques to improve the application and efficacy of various technologies as compared with the application and efficacy of legacy approaches.

SUMMARY

The present disclosure provides systems, methods, and computer program products suited to address the aforementioned issues with legacy approaches. More specifically, the present disclosure provides a detailed description of techniques used in systems, methods, and in computer program products for accessing multiple content storage facilities using source-aware storage policies. Certain embodiments are directed to technological solutions for dynamically determining operations to be performed at multiple content storage facilities using a policy management layer to apply storage policies based in part on source attributes, which embodiments advance the relevant technical fields, as well as advancing peripheral technical fields. The disclosed embodiments modify and improve over legacy approaches. In particular, the herein-disclosed techniques provide technical solutions that address the technical problems attendant to using various cloud-based content storage facilities with facility-agnostic and source-aware commands and policies, and such technical solutions serve to reduce use of computer memory, reduce demand for computer processing power, and reduce communication overhead that is needed. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of high-performance computing as well as advances in the technical fields of distributed storage.

Some embodiments commence upon deploying a server in a cloud-based environment, such that the server is configured to interface with one or more storage facilities that are accessible over a network by the server to provide cloud-based storage services in response to a storage command originating from a user device. The deployed server is connected to the network such that the server receives storage commands that pertain to one or more source objects that are associated with a set of source attributes. A policy manager applies one or more storage policies by determining a set of storage policies based at least in part on the one or more associated source attributes. The policy manager accesses a routing table of target storage locations and sends the source objects over the network to one or more of the target storage locations.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

BRIEF DESCRIPTION OF THE DRAWINGS

The drawings described below are for illustration purposes only. The drawings are not intended to limit the scope of the present disclosure.

FIG. 1A depicts a provider-oriented multi-path approach for accessing multiple content storage facilities.

FIG. 1B depicts a storage facility-agnostic approach for accessing multiple content storage facilities using source-aware storage policies, according to an embodiment.

DETAILED DESCRIPTION

Figure 1C:
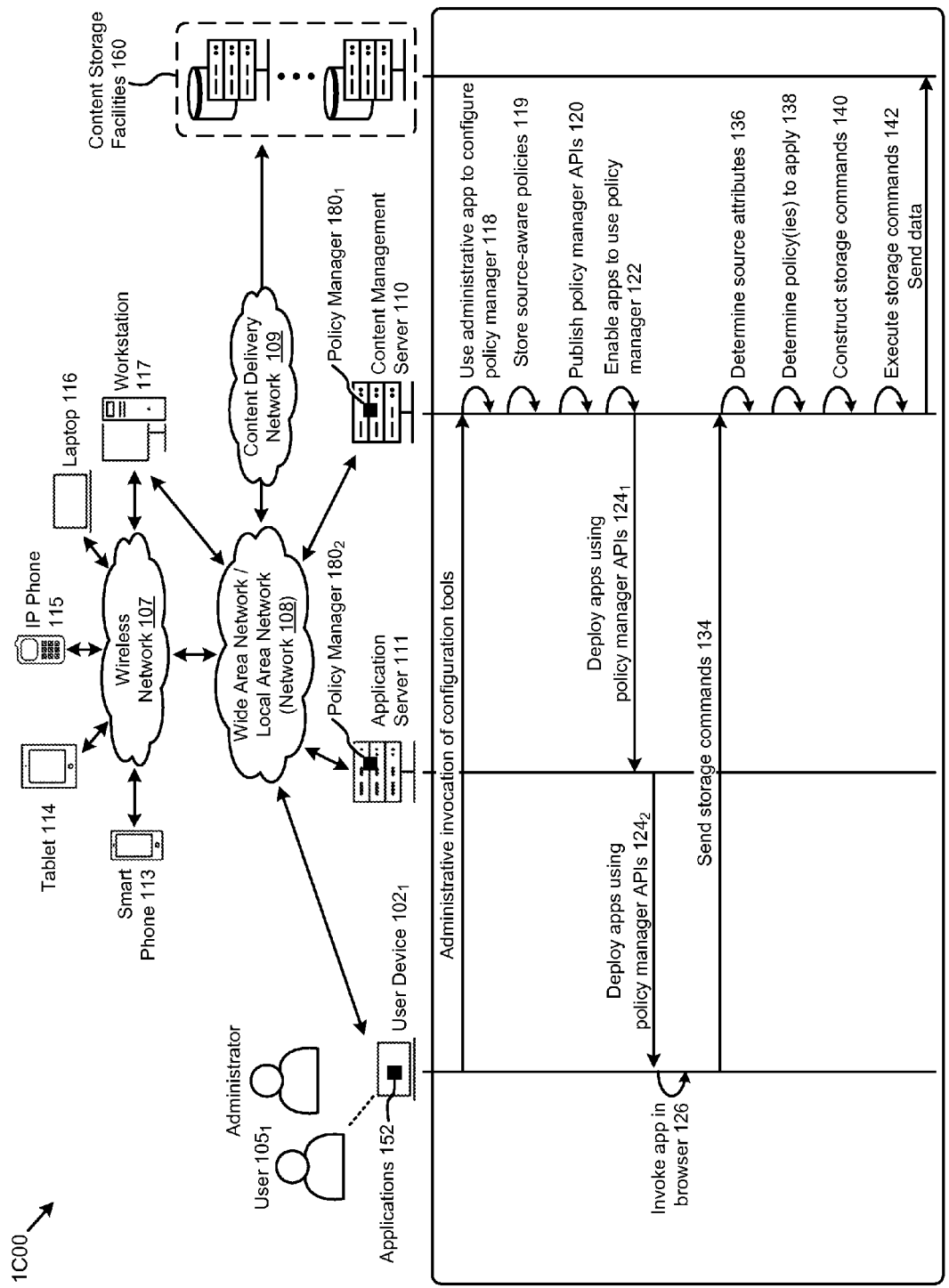
FIG. 1C depicts a protocol implemented by system components for accessing multiple content storage facilities using source-aware storage policies, according to some embodiments.

Some embodiments of the present disclosure address the problem of using various cloud-based content storage facilities with facility-agnostic and source-aware commands and policies and some embodiments are directed to approaches for dynamically determining operations to be performed at multiple content storage facilities using a policy management layer to apply storage policies based in part on source attributes. More particularly, disclosed herein and in the accompanying figures are exemplary environments, systems, methods, and computer program products for accessing multiple content storage facilities using source-aware storage policies.

Overview

The proliferation of cloud-based services and platforms continues to increase. One benefit of using a cloud-based storage service is efficient use of electronic content storage facilities and computing resources for storing digital content (e.g., "files"). Where and how content is stored and accessed is specified in part by storage policies defined by various stakeholders in the cloud-based storage ecosystem (e.g., the client, the cloud-based storage service provider, the storage facility provider, etc.) based on various policy and/or security objectives (e.g., security levels, accessibility, loss protection, cost, etc.). As the number of content storage facility options and complexity of policy objectives increase, however, maintaining a desired storage policy flexibility can be difficult. Legacy approaches to providing such storage policy flexibility are limited in that they are based on facility-specific commands and policies, and do not consider varying source attributes when applying the policies.

To address the need for using various cloud-based content storage facilities with facility-agnostic and source-aware commands and policies, the techniques described herein discuss (1) an approach and protocol for communication between a client application and a cloud-based storage system using a source-aware policy management layer, (2) a source-aware policy application techniques and associated data structures for dynamically generating operations to be performed at multiple content storage facilities, and (3) policy rule and routing table specifications and use approaches.

Various embodiments are described herein with reference to the figures. It should be noted that the figures are not necessarily drawn to scale and that the elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment. An aspect or an advantage described in conjunction with a particular embodiment is not necessarily limited to that embodiment and can be practiced in any other embodiments even if not so illustrated. Also, reference throughout this specification to "some embodiments" or "other embodiments" refers to a particular feature, structure, material, or characteristic described in connection with the embodiments as being included in at least one embodiment. Thus, the appearances of the phrase "in some embodiments" or "in other embodiments" in various places throughout this specification are not necessarily referring to the same embodiment or embodiments.

Definitions

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

FIG. 1A depicts a provider-oriented multi-path approach 1A00 for accessing multiple content storage facilities. As an option, one or more instances of multi-path approach or any aspect thereof may be implemented in the context of the architecture and functionality of the embodiments described herein. Also, the multi-path approach or any aspect thereof may be implemented in any desired environment.

The shown provider-oriented multi-path approach 1A00 is a merely one approach for providing client applications (e.g., application $152_1$, application $152_2$, . . . , and application $152_N$) access content storage facilities in a cloud-based storage system. As shown, the content storage facilities 160 comprise a high-availability storage facility 161 and a local network area storage facility 162 provided by "Provider 1", and a plurality of external storage facilities (e.g., external storage facility $163_1$, . . . , and external storage facility $163_M$) provided by associated providers (e.g., "Provider 2", . . . , and "Provider M", respectively). The high-availability storage facility 161 can be a storage facility co-located with the cloud-based storage service, and the local network area storage facility 162 can be a storage facility included in a dedicated private cloud. Further, the plurality of external storage facilities can be third-party storage facilities (e.g., from Amazon, Google, HP, IBM, Rackspace, etc.). The applications can use the content storage facilities 160 through certain associated facility-specific application programming interfaces (APIs) such as is depicted by the instances of provider 1 API $154_1$, provider 2 API $154_2$, . . . , and provider M API $154_M$.

In this approach, each application is required to know a priori the target storage facility and construct, and issue facility-specific and/or provider-specific storage commands. Also, the provider-specific APIs can only apply storage policies specific to the one or more storage facilities associated with the provider, and do not consider varying source attributes (e.g., client location, enterprise service level agreement or "SLA", enterprise tariffs, etc.) when applying the policies. Such facility-specific policies that do not consider certain source attributes can be described as source-oblivious policies 156. The provider-specific APIs and source-oblivious policies 156 in the provider-oriented multi-path approach 1A00 limit the ability of the client applications to efficiently use the multiple available storage facility options (e.g., in addition to the content storage facilities 160) and meet or exceed changing policy objectives. Such limitations are addressed by the herein disclosed techniques as described in the approach depicted in FIG. 1B.

FIG. 1B depicts a storage facility-agnostic approach 1B00 for accessing multiple content storage facilities using source-aware storage policies. As an option, one or more instances of storage facility-agnostic approach 1B00 or any aspect thereof may be implemented in the context of the architecture and functionality of the embodiments described herein. Also, the storage facility-agnostic approach 1B00 or any aspect thereof may be implemented in any desired environment.

The embodiment shown in FIG. 1B comprises the content storage facilities 160, the client applications (e.g., application $152_1$, application $152_2$, . . . , and application $152_N$), and the provider APIs (e.g., provider 1 API $154_1$, provider 2 API $154_2$, . . . , and provider M API $154_M$) described as pertains to FIG. 1A. The storage facility-agnostic approach 1B00 further includes a layer comprising a policy manager 180 between the client applications and provider APIs. In this approach, the policy manager 180 receives facility-agnostic commands from the client applications, generates source attributes from the commands and associated content (e.g., objects), and uses the source attributes to dynamically apply storage policies and determine operations to be performed on the content storage facility 160. Since the source attributes are used to determine, at least in part, the storage policies to apply, such policies can be described as source-aware policies 158.

In the herein disclosed approach shown in FIG. 1B, the problem of using various cloud-based content storage facilities with facility-agnostic and source-aware commands and policies is addressed. Specifically, the client applications can construct and issue commands that need only conform to a structure that can be interpreted by the policy manager 180, and that can be agnostic to the specific provider and/or storage facility. This characteristic enables the content storage facility 160 to change without requiring changes to the applications. The policy manager 180 can further apply storage policies according to policy rules that can be based at least in part on certain source attributes. This characteristic enables an increased flexibility in applying policies across the content storage facility 160 in order to meet changing policy objectives. One embodiment of an environment and protocol for implementing the storage facility-agnostic approach 1B00 for accessing multiple content storage facilities using source-aware storage policies is described as pertains to FIG. 1C.

FIG. 1C depicts a protocol 1C00 implemented by system components for accessing multiple content storage facilities using source-aware storage policies. As an option, one or more instances of protocol 1 C00 or any aspect thereof may be implemented in the context of the architecture and functionality of the embodiments described herein. Also, the protocol 1 C00 or any aspect thereof may be implemented in any desired environment.

As shown in FIG. 1C, protocol 1C00 depicts a set of high-level interactions (e.g., operations, messages, etc.) among various computing systems (e.g., servers and devices) interconnected by a wireless network 107, a network 108, and a content delivery network 109. The wireless network 107, the network 108, and the content delivery network 109 can comprise any combination of a wide area network (e.g., WAN), local area network (e.g., LAN), cellular network, wireless LAN (e.g., WLAN), or any such techniques for enabling communication of computing systems. The wireless network 107, the network 108, and the content delivery network 109 can be referred to collectively as the Internet. The content delivery network 109 can comprise any combination of a public network and a private network. The computing systems shown in protocol 1C00 comprise at least one instance of a content management server 110, at least one instance of an application server 111, and at least one instance of a content storage facility 160. The servers and storage facilities shown in protocol 1C00 can represent any single computing system with dedicated hardware and software, multiple computing systems clustered together (e.g., a server farm), a portion of shared resources on one or more computing systems (e.g., virtual server), or any combination thereof.

For example, the content management server 110 and the content storage facilities 160 can comprise a cloud-based storage system that provides content management services. In one or more embodiments, and as shown, the policy manager can be executed at the content management server (e.g., see policy manager $180_1$) and/or at an application server (e.g., see policy manager $180_2$). The computing systems shown in protocol 1C00 further comprise an instance of a user device $102_1$ that can represent one of a variety of other computing devices (e.g., a smart phone 113, a tablet 114, an IP phone 115, a laptop 116, a workstation 117, etc.) having hardware and software (e.g., applications 152) capable of processing and displaying information (e.g., web page, graphical user interface, etc.) and communicating information (e.g., web page request, user activity, content objects, etc.) over the wireless network 107, the network 108, and the content delivery network 109. As shown, the user device $102_1$ can be operated by an administrative or other sort of a user $105_1$. More particularly, an administrative user can use an administrative application (see operation 118) to define source-aware policies (as well as other policies), and those policies can be stored at the content management server and/or other locations (see operation 119). A set of policy manager APIs can be published so as to be used by applications (see operation 120).

As shown, such applications can be enabled to use the policy manager 180 (see operation 122), and source-aware policies can be provided to the content management server 110 (see message $124_1$) and/or source-aware policies can be provided to the application server 111 (see message $124_2$) to serve to users invoking the applications. In this embodiment, user-initiated operations using source-aware policies commence as follows: The user device $102_1$, the application server 111, the content management server 110, and the content storage facilities 160 can interact as shown, and the aforementioned computing resources can individually or cooperatively access one or more content storage facilities using source-aware storage policies. For example, user $105_1$ can invoke one or more instances of applications 152 at user device $102_1$ (see operation 126), and application server 111 can respond by serving the requested application view for rendering on a browser operating on the user device $102_1$. The application can be used to specify various source-aware policy rules, and such specification can be inherent (e.g., derived from a source object type or from other source object attributes) or explicit (e.g., by specification of a particular source-aware policy or policies). For example, the user $105_1$ or another authorized user (e.g., storage policy administrator) can specify that policy "policyABC" can be applied when certain source attributes satisfy certain conditions. Such source-aware policy rules can be forwarded to the content management server 110 for use by the policy manager 180 (see message 132). In another situation, and again, strictly as an example, the user $105_1$ or another authorized user (e.g., storage policy administrator) can specify that policy "policyXYZ" is to be applied to an uploaded item when the uploaded items is of "source type"="document", or "sensitivity"="secret".

When content storage commands are issued by the user $105_1$ from user device $102_1$ (see message 134), the policy manager 180 at the content management server 110 can use the commands and associated content (e.g., an object or objects) to generate source attributes (see operation 136). Using the source attributes and the source-aware policy rules, the policy manager 180 can determine the policy or policies to apply (see operation 138). Based on the identified policy or policies, associated storage commands can be constructed (see operation 140) and executed on target storage locations in the content storage facilities 160 specified in the policies (see operation 142). Further operations and messages in protocol 1C00 can depend on the specific content storage commands issued by the user $105_1$. In some cases, one or more content streams can transfer from the user device $102_1$ to the content storage facilities 160 (e.g., via an upload path). In other cases, one or more content streams can be transferred from the content storage facilities 160 to the user device $102_1$ (e.g., via a download path). A computing environment for implementing the protocol 1C00 is shown and described as pertains to FIG. 2.

Figure 2:
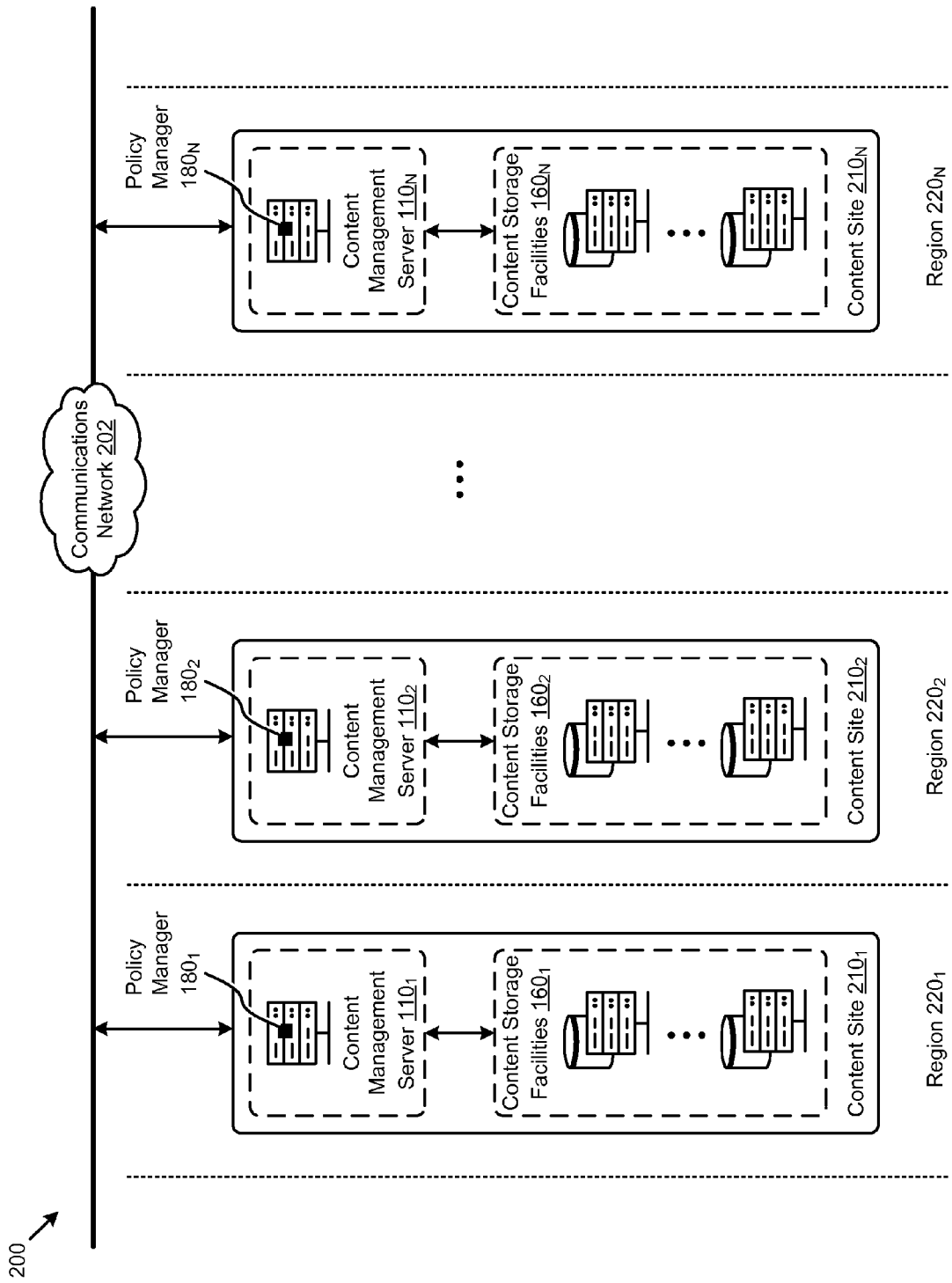
FIG. 2 is a schematic of a computing environment for implementing systems that access multiple content storage facilities using source-aware storage policies, according to an embodiment.

FIG. 2 is a schematic of a computing environment 200 for implementing systems that access multiple content storage facilities using source-aware storage policies. As an option, one or more instances of computing environment 200 or any aspect thereof may be implemented in the context of the architecture and functionality of the embodiments described herein. Also, the computing environment 200 or any aspect thereof may be implemented in any desired environment.

As shown in FIG. 2, the computing environment 200 comprises a plurality of content sites (e.g., content site $210_1$, content site $210_2$, . . . , and content site $210_N$) each comprising a respective instance of the content management server 110 (e.g., content management server $110_1$, content management server $110_2$, . . . , and content management server $110_N$) and a respective instance of the content storage facilities 160 (e.g., content storage facilities $160_1$, content storage facilities $160_2$, . . . , and content storage facilities $160_N$). Further, an instance of the policy manager 180 (e.g., policy manager $180_1$, policy manager $180_2$, . . . , and policy manager $180_N$) is operated by the respective content management server at each content site. The aforementioned computing resources can communicate through a communications network 202 (e.g., wireless network 107, network 108, content delivery network 109, the Internet, an intranet, a private network, etc.).

In the embodiment and example shown, the content sites are associated with geographic regions (e.g., region $220_1$, region $220_2$, . . . , and region $220_N$). For example, the regions can be regions within countries (e.g., US-1, US-2, EUR-1, EUR-2, etc.), or can be any geographic indication such as a province or state or city, etc. As another example, the regions can be associated with time zones. Other types of regions and partitioning of sites are possible. For example, computing environment 200 can have meta sites and content sites. The meta sites can be responsible for supporting client applications and associated metadata, and the content sites can manage content. Further, each content site can have zero or more storage facilities of various types (e.g., NAS, SAN, etc.) and can have the ability to store metadata. The content sites can have access to the metadata and content storage facilities at other content sites. The content sites can also access the metadata stored at a meta site. For example, such access enables support for disaster recovery and temporary outages. Further, the content sites can be associated in protection groups or pools. Such pools increase availability and reliability by replicating metadata and content. The pools and their attributes (e.g., priority, retention, etc.) can be specified in associated policies. For example, content sites US-1 and US-2 can comprise a pool, such that the US-1 metadata is replicated to US-2, and the US-2 metadata is replicated to US-1. Pools can further enable continued operation in the presence of a failed content site and/or meta site. For example, when a content site has failed during a content upload operation, the content site in the pool with the next highest priority will be used to perform the upload, and a replication operation is queued for the failed content site when is back online. As another example, when a meta site has failed during content upload, another content site (e.g., in the pool) can be selected to service the request as a proxy, and the metadata written to the failed meta site when it is back online.

Figure 3:
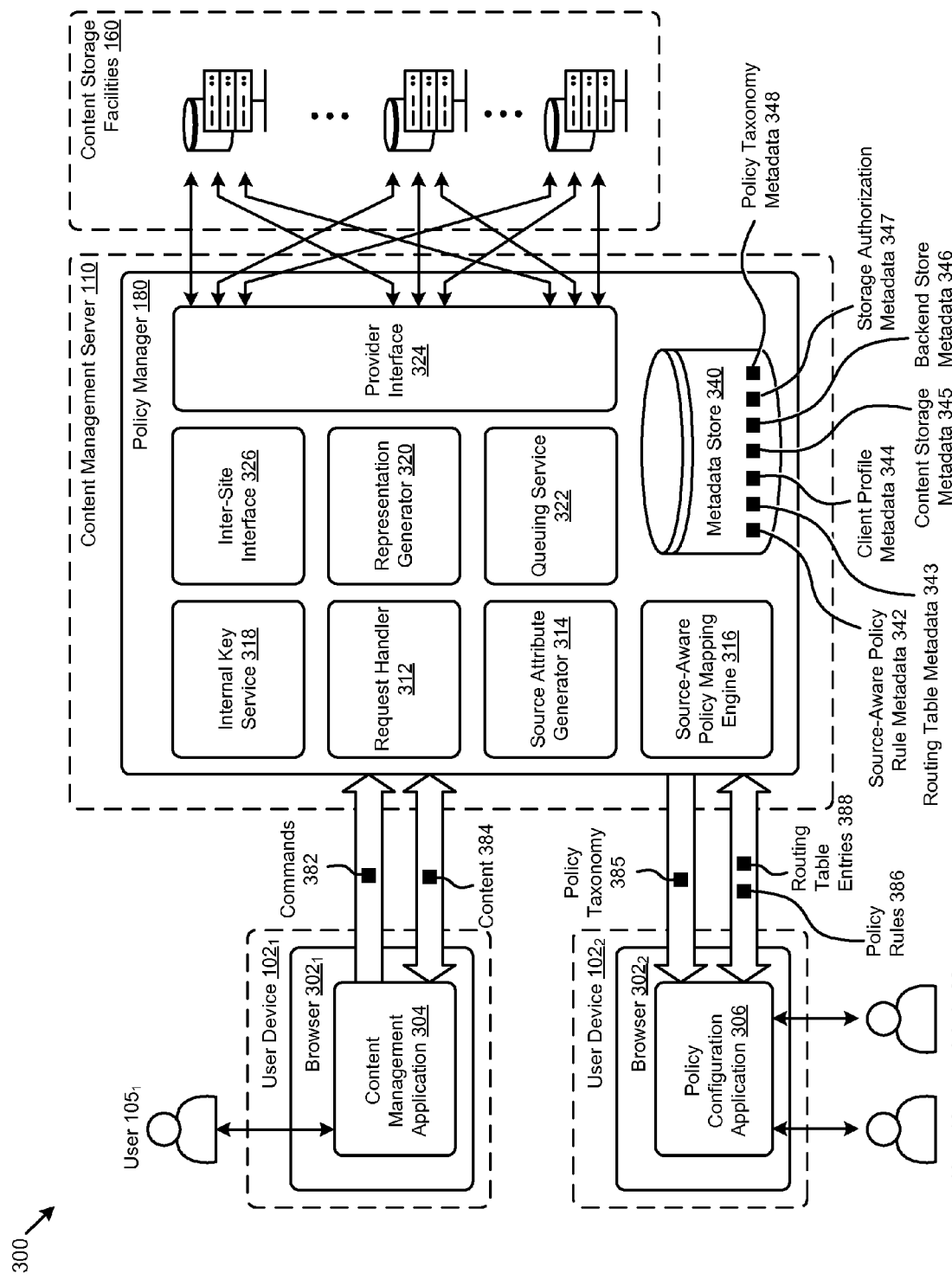
FIG. 3 is a block diagram of a system for implementing accessing multiple content storage facilities using source-aware storage policies, according to an embodiment.

FIG. 3 is a block diagram of a system 300 for implementing accessing multiple content storage facilities using source-aware storage policies. As an option, one or more instances of system 300 or any aspect thereof may be implemented in the context of the architecture and functionality of the embodiments described herein. Also, the system 300 or any aspect thereof may be implemented in any desired environment.

The system 300 illustrates an embodiment of the herein disclosed techniques for accessing multiple content storage facilities using source-aware storage policies. As shown, system 300 comprises one or more instances of the components described in FIG. 1C with more details to further describe the herein disclosed techniques and approach. Other components and/or operation partitioning are possible. Specifically, the content management server 110 is shown communicating with the content storage facilities 160, the user device $102_1$, and a second instance of a user device $102_2$. The policy manager 180 operating at the content management server 110 is shown to further comprise a request handler 312, a source attribute generator 314, a source-aware policy mapping engine 316, an internal key service 318, a representation generator 320, a queuing service 322, a provider interface module 324, an inter-site interface 326, and a metadata store 340. A content management application 304 is also shown operating on a browser $302_1$ by user $105_1$ at user device $102_1$. Further, a policy configuration application 306 is shown operating on a browser $302_2$ by a user $105_2$ and/or administrator $205_1$ at user device $102_2$.

Various data flows, data structures, and data messages among the components in the system 300 are also shown. More specifically, the policy configuration application 306 can receive data describing a policy taxonomy 385 can be used by the policy configuration application 306 to enable an administrator $205_1$ to specify instances of policy rules 386 and routing table entries 388. For example the policy taxonomy 385 can be selected from the policy taxonomy metadata 348 in the metadata store 340, and can be used to populate certain dropdown selection elements in the policy configuration application 306 graphical user interface or GUI. The policy rules 386 and routing table entries 388 can further be received by the policy manager 180 and included in the source-aware policy rule metadata 342 and the routing table metadata 343, respectively, in the metadata store 340. The user $105_1$ can further issue instances of commands 382 to the policy manager 180 using the content management application 304. The content management application 304 can also send and receive content (e.g., objects) to and from the policy manager 180.

The commands 382 and content 384 are received by the policy manager 180 by the request handler 312 and forwarded as required by the specific commands received. For example, the commands 382 and associated content can be forwarded to the source attribute generator 314 to generate various source attributes that can be used by the source-aware policy mapping engine 316 to determine one or more policies to apply in constructing storage commands to be executed by the provider interface module 324 in the content storage facilities 160. In some cases, the commands 382 will further invoke operations at the representation generator 320 and/or the queuing service 322. For example, image objects might require various representations (e.g., thumbnails, previews, tiles, etc.) to be generated by the representation generator 320 and stored with the original image object. Also, for example, a certain applied policy might require replications of the original object to be stored (e.g., for reasons of availability, reliability, performance, etc.). In this case, the replications can be scheduled for asynchronous storage by the queuing service 322. The inter-site interface 326 can further be used to enable communications among associated content sites for sharing metadata, content, and other operations. In addition to the aforementioned metadata stored in the metadata store 340, the policy manager 180 further has access to client profile metadata 344, content storage metadata 345, backend store metadata 346, and storage authorization metadata 347, for various purposes. Further details pertaining to the metadata and related data structures and components are disclosed in FIG. 4B and FIG. 4C and the associated discussion.

Figure 4A:
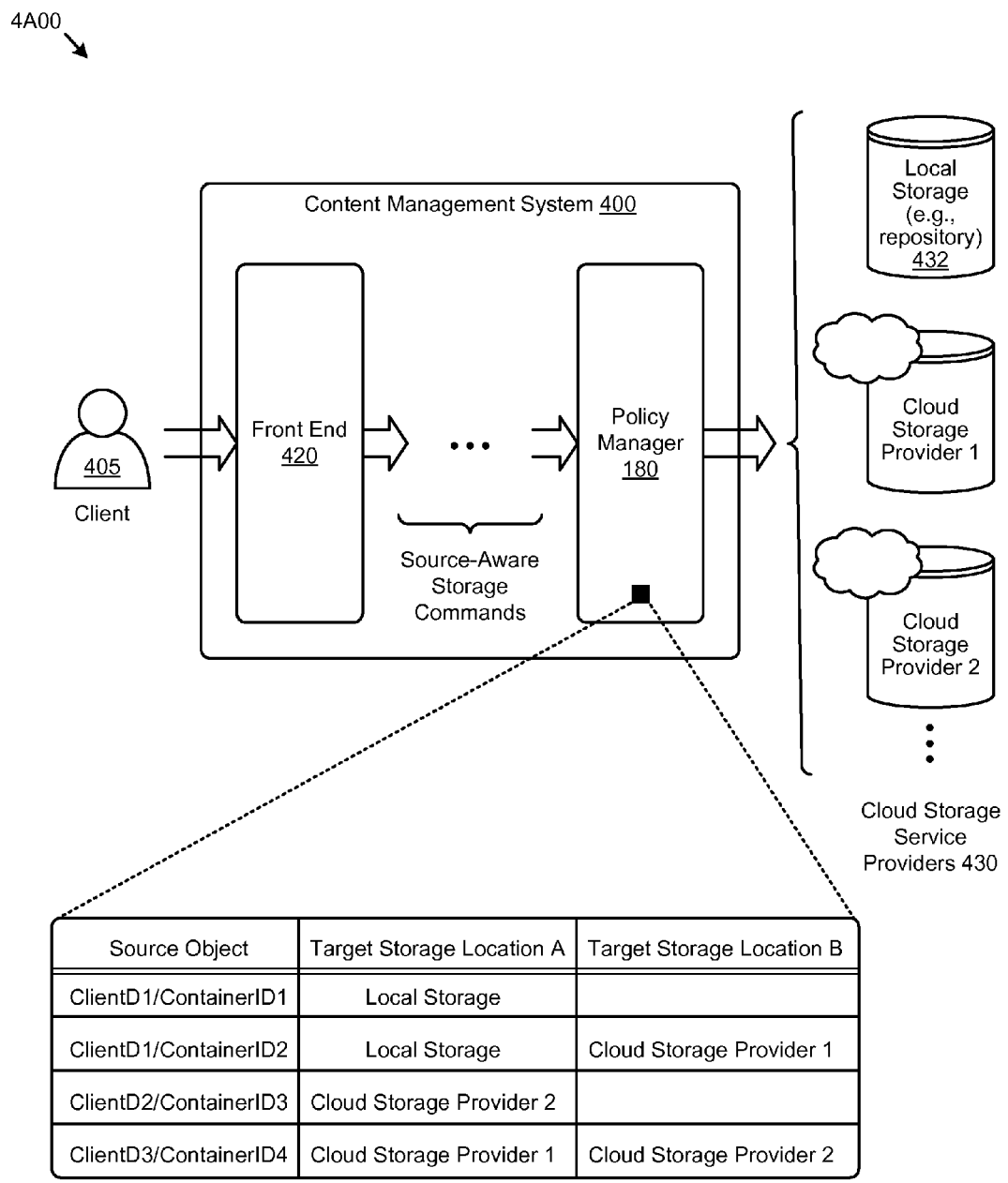
FIG. 4A illustrates a system for accessing multiple content storage facilities using source-aware storage policies, according to some embodiments.

FIG. 4A illustrates a system for accessing multiple content storage facilities using source-aware storage policies. As shown, a client 405 (e.g., a user or an administrator or a bot) can access a content management system 400 composed of one or more content management servers. Any of the constituent content management servers of the content management system can be situated in any geography or region, and any of the constituent content management servers can implement a frontend 420. Strictly as one exemplary embodiment, a frontend 420 can be composed of graphical user interfaces and/or applications (e.g., application $152_1$, application $152_2$, ..., and application $152_N$) that rely on one or more instances of a policy manager 180 to access one or more instances of cloud storage service providers 430 (e.g., cloud storage provider 1, cloud storage provider 1, etc.) and/or one or more instances of local storage (e.g., repository 432). The frontend 420 can communicate (e.g., over the Internet) to one or more instances of a policy manager, and such communication can include a source object and/or a source object identifier that is destined to be stored at one or more target storage locations in accordance with one or more source-aware policies. The content management system 400 can span multiple geographies.

In some situations, a frontend can be partitioned so as to produce dynamically-generated source-aware storage commands that are delivered to the policy manager (e.g., as shown). One possible partitioning and source-aware policy usage techniques thereto are shown and described as pertains to FIG. 4B.

Figure 4B:
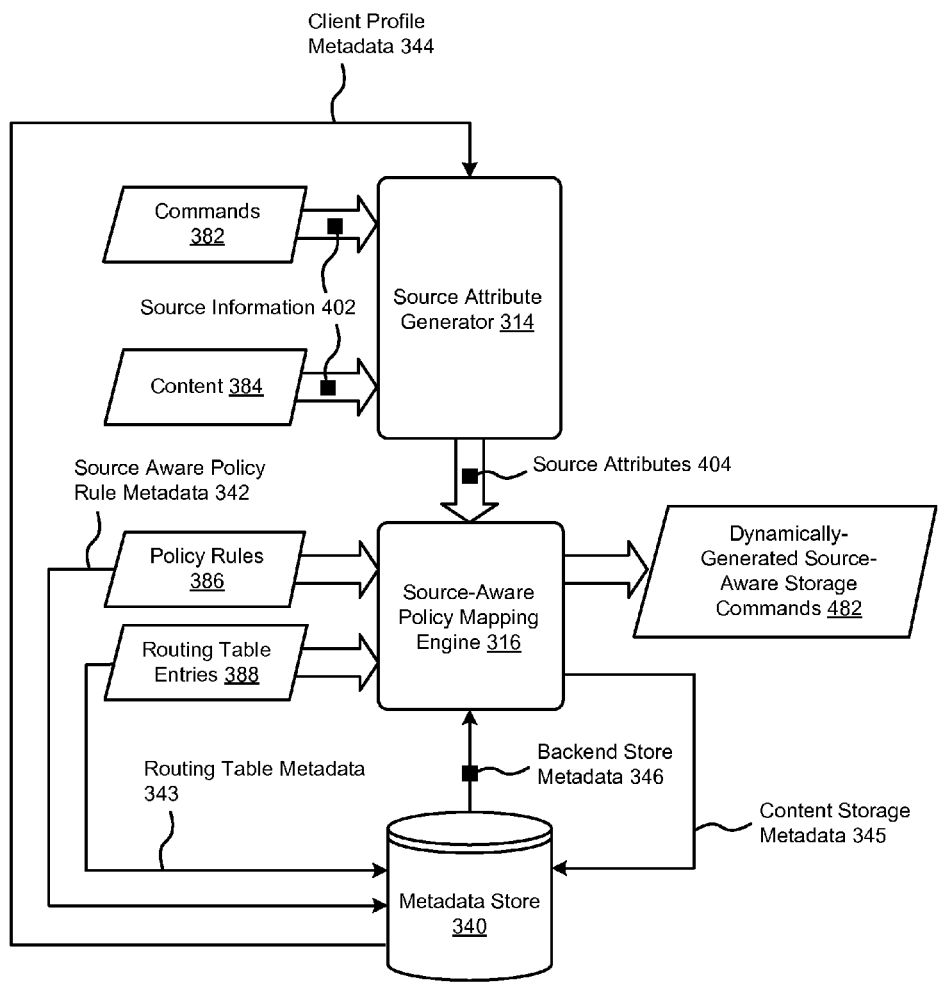
FIG. 4B illustrates a source-aware policy usage technique used in systems for accessing multiple content storage facilities using source-aware storage policies, according to some embodiments.

FIG. 4B illustrates a source-aware policy usage technique 4B00 used in systems for accessing multiple content storage facilities using source-aware storage policies. The source-aware policy usage technique 4B00 shown in FIG. 4B can produce certain dynamically-generated source-aware storage commands 482 in systems (e.g., system 300) for accessing multiple content storage facilities using source-aware storage policies. Specifically, as shown, the source attribute generator 314 can receive input (e.g., commands 382 and content 384) comprising one or more forms of source information 402 that can be related to client profile metadata 344 in order to derive or determine one or more instances of source attributes 404. For example, the source information 402 might comprise a userID and an ipAddress that can be used to derive an enterprise SLA level and geographic or "geo" location, respectively, that can be included in the source attributes 404. The source attributes 404 can then be received by the source-aware policy mapping engine 316 and applied to the policy rules 386 to determine one or more policies and respective entries in the routing table metadata 343 to deploy based on the specific instance or instances of commands 382 received. The source-aware policy mapping engine 316 can then use the backend store metadata 346 and other information to construct any number of dynamically-generated source-aware storage commands 482 that are associated with or derived from the selected policies. The source-aware policy mapping engine 316, and/or another component in the policy manager 180, can further update the content storage metadata 345 when the storage commands have been successfully executed. Further details (e.g., schema, API, etc.) for the aforementioned metadata, information, attributes, and commands are described as pertains to FIG. 4C.

Figure 4C:
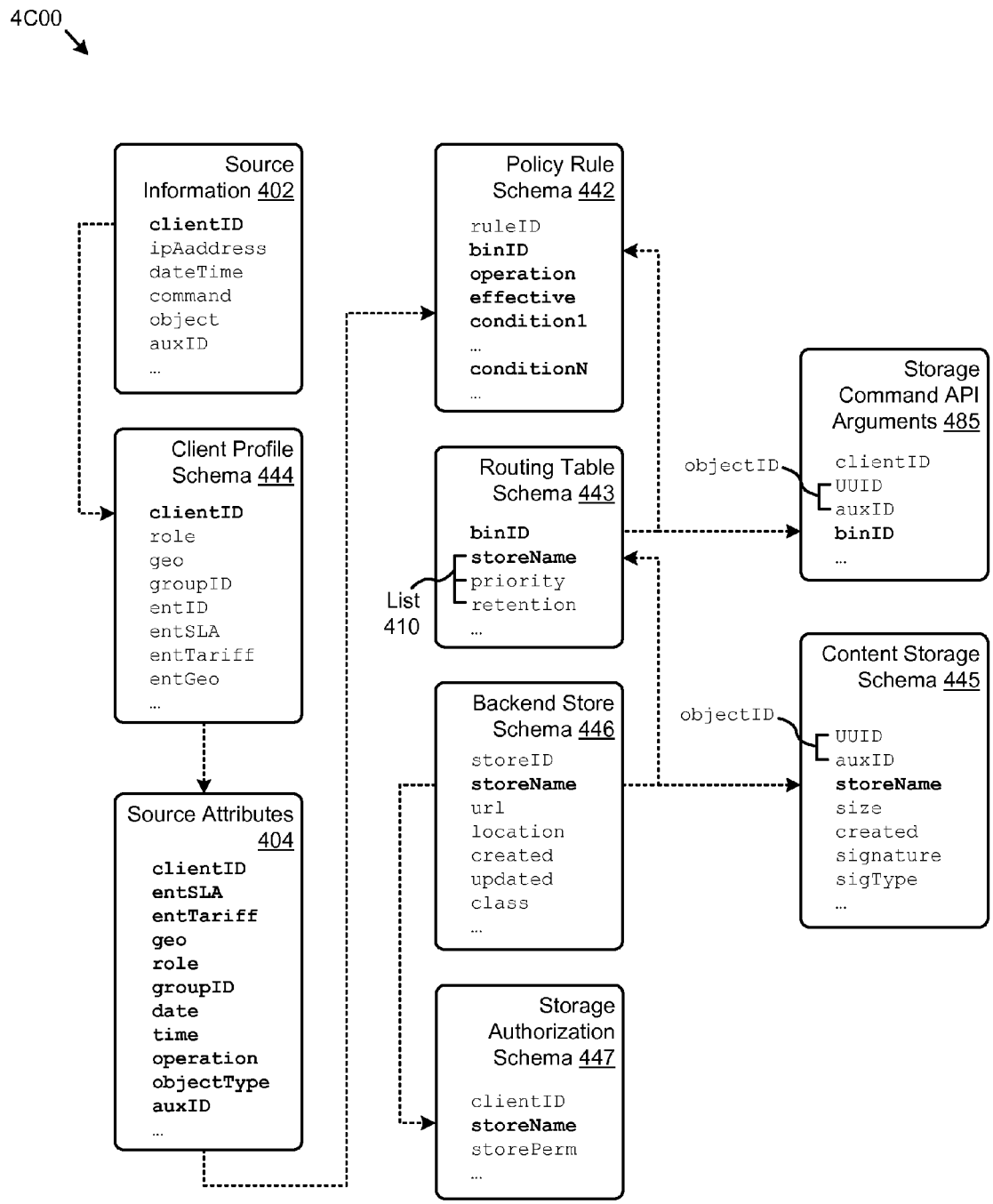
FIG. 4C depicts a diagram showing data structure relationships used in systems for accessing multiple content storage facilities using source-aware storage policies, according to some embodiments.

FIG. 4C depicts a diagram showing data structure relationships 4C00 used in systems for accessing multiple content storage facilities using source-aware storage policies. As an option, one or more instances of the data structure relationships 4C00 or any aspect thereof may be implemented in the context of the architecture and functionality of the embodiments described herein. Also, the data structure relationships 4C00 or any aspect thereof may be implemented in any desired environment.

The shown data structure relationships 4C00 depict example information, attributes, schema, command arguments, and select entity relationships associated with data structures and datasets used in systems for accessing multiple content storage facilities using source-aware storage policies. Other information and relationships are possible. Specifically, the source information 402 (e.g., included in commands 382 and/or in content 384) can comprise client ID, ipAddress, dateTime, command information, object information, auxID, and might contain other information and/or be derived from other locations. For example, clientID, ipAddress, and dateTime might be session parameters captured in a cookie log file. Also, for example, the auxID can be specified by the client and/or client application to identify one or more objects. As shown, the client ID in the source information 402 can be used to look up associated information in the client profile metadata 344. Specifically, for example, the client profile schema 444 shows such associated metadata might be a table having columns for the role, geo location, and groupID associated with the clientID, and columns for related enterprise level information, including entID, entSLA, entTariff, entGeo, and other columns of information. The source information 402 and associated instances of client profile metadata 344 can be used (e.g., by source attribute generator 314) to generate descriptions (e.g., key-value pairs) to form instances of source attributes 404 such as client ID, entSLA, entTariff, geo, groupID, date, time, operation, objectType, auxID, and other attributes. For example, the source attributes 404 might comprise key-value pairs in the form of (for example) role=Admin, entSLA=Tier1, and geo=US.

As shown, the source attributes 404 can be applied to one or more source-aware policy rules codified in the source-aware policy rule metadata 342 and structured as described by the policy rule schema 442. Specifically, a policy rule can be described by a ruleID, a binID, an associated storage operation, an effective time period, one or more conditions (e.g., condition1, . . . , and conditionN), and other information. More specifically, certain source attributes 404 (e.g., role=Admin, etc.) can be used (e.g., by source-aware policy mapping engine 316) as rule operands to determine the policy (e.g., binID="policyAdmin") to execute. The binID references a detailed policy definition stored in the routing table metadata 343 and structured according to the routing table schema 443. Specifically, the storage policies can be defined by a list 410 of one or more storage facilities described by a storeName, a priority attribute (e.g., synchronous, asynchronous, etc.), and a retention attribute (e.g., infinite, two weeks, etc.). Other information can be used to describe a given policy. In some embodiments, the order of the storage facilities in the list 410 indicates a priority relationship and/or other relationships. When such lists are communicated using JSON syntax, they can be referred to as "fragments". The storeName further references the backend store metadata 346 that can be structured according to the backend store schema 446. As shown by the backend store schema 446, the backend store metadata 346 describes the physical storage facility location associated with a portion of a given storage policy. Specifically, the backend store metadata 346 might comprise a table having columns for store ID, storeName, the storage facility URL, the storage path or directory location, a created time, an updated time, a class (e.g., 1=flash, 2=fastDisk, . . . , N=coldStorage), a backendType, a path, a layoutVersion indicator, a readOnly characteristic, and other columns. In some cases, the storeID can be a unique identifier associated with the instance of the policy manager 180 communicating with a given storage facility and/or associated with the content site comprising the given storage facility. A reference to the storeName can further be included in the storage authorization metadata 347, as shown in the storage authorization schema 447, and used with permissions store Perm and other information to determine if client clientID is authorized to access storeName.

Embodiments of content storage metadata 345 can be created and/or updated and/or accessed according to content storage schema 445. Specifically, as shown, each row in the content storage metadata 345 table can comprise columns for a UUID, the auxID, the storeName, a stored object size, a created time, an encryption signature, and a signature type sigType (e.g., SHA-1, etc.).

Any aspects of encryption, including aspects of the aforementioned internal key service can be referenced and/or included content storage metadata. Further details regarding general approaches to encryption are described in U.S. application Ser. No. 14/472,540 titled "ENHANCED REMOTE KEY MANAGEMENT FOR AN ENTERPRISE IN A CLOUD-BASED ENVIRONMENT" filed on Aug. 29, 2014, which is hereby incorporated by reference in its entirety.

The storeName can reference a specific store location described in the backend store metadata 346. In some embodiments, the UUID and the storeID can be the same globally unique identifier to reduce storage command complexities. Also, in one or more embodiments, the auxID can be concatenated to the UUID to form a contentID. For example, the auxID can be used to distinguish various representations of the same originating content object. In other embodiments, a containerID and/or the auxID and/or the contentID and/or the UUID are used in respective contexts.

Given the aforementioned information, attributes, schema, entity relationships, and other such data, the dynamically-generated source-aware storage commands 482 described in FIG. 4B can be constructed, in whole or in part, by using storage command API arguments. Specifically, as shown, storage command API arguments 485 comprise the client ID, the objectID (e.g., the UUID and the auxID), the binID, and other arguments. According to the herein disclosed techniques, a storage command API using the storage command API arguments 485 can be can used to issue (e.g., by the provider interface module 324 of the policy manager 180) dynamically-generated source-aware storage commands 482 to one or more content storage facilities. In one or more embodiments, such a storage command API can comprise the commands shown in Table 1 and Table 2 below.

TABLE 1

Storage Command API - Content Access Operations

| Ref | Information |
|---|---|
| 1 | Generate Object UUID<br>POST storage/<clientID>/<binID> |
| 2 | Upload an Object<br>PUT storage/<clientID>/<binID>/<objectID> |
| 3 | Upload Multiput Object<br>PUT storage/<clientID>/<binID>/<objectID>?part=<N> |
| 4 | Get Status of Multiput Object Upload<br>GET storage/<clientID>/<binID>/<objectID>?status |
| 5 | Commit Multiput Object<br>POST storage/<clientID>/<binID>/<objectID>?commit |
| 6 | Download an Object<br>GET storage/<clientID>/<binID>/<objectID> |
| 7 | Delete Object<br>DELETE storage/<clientID>/<binID>/<objectID> |
| 8 | List Objects Associated with UUID<br>GET storage/<clientID>/<binID>/<UUID>?list |
| 9 | Get Byte Offset of Incomplete Upload<br>HEAD storage/<clientID>/<binID>/<objectID> |

TABLE 2

Storage Command API - Management Operations

| Ref | Information |
|---|---|
| 1 | Upload Content Storage Metadata<br>PUT storage/<clientID>/<binID>/<objectID>?metadata |
| 2 | Get Object Info<br>GET storage/<clientID>/<binID>/<objectID>?info |
| 3 | Create New Backend Store<br>POST storageid |
| 4 | Update Metadata for Backend Store<br>PUT storageid/<storeID> |
| 5 | Update Select Metadata for Backend Store<br>PATCH storageid/<storeID> |
| 6 | Get Metadata for a Backend Store<br>GET storageid/<storeID> |
| 7 | Delete a Backend Store<br>DELETE storageid/<storeID> |
| 8 | Get Metadata for all Backend Stores<br>GET storageid/db |

TABLE 2-continued

Storage Command API - Management Operations

| Ref | Information |
|---|---|
| 9 | Get Metadata for Cached Backend Stores<br>GET storageid/cache |
| 10 | Reload Backend Store Cache from Database<br>PUT storageid/reload |
| 11 | Create or Update Storage Policy<br>PUT policy/<binID> |
| 12 | Delete a Storage Policy<br>DELETE policy/<binID> |
| 13 | Get Metadata for all Storage Policies<br>GET policy/db |
| 14 | Get Metadata for Cached Storage Policies<br>GET policy/cache |
| 15 | Reload Storage Policy Cache from Database<br>PUT policy/reload |

Figure 5A:
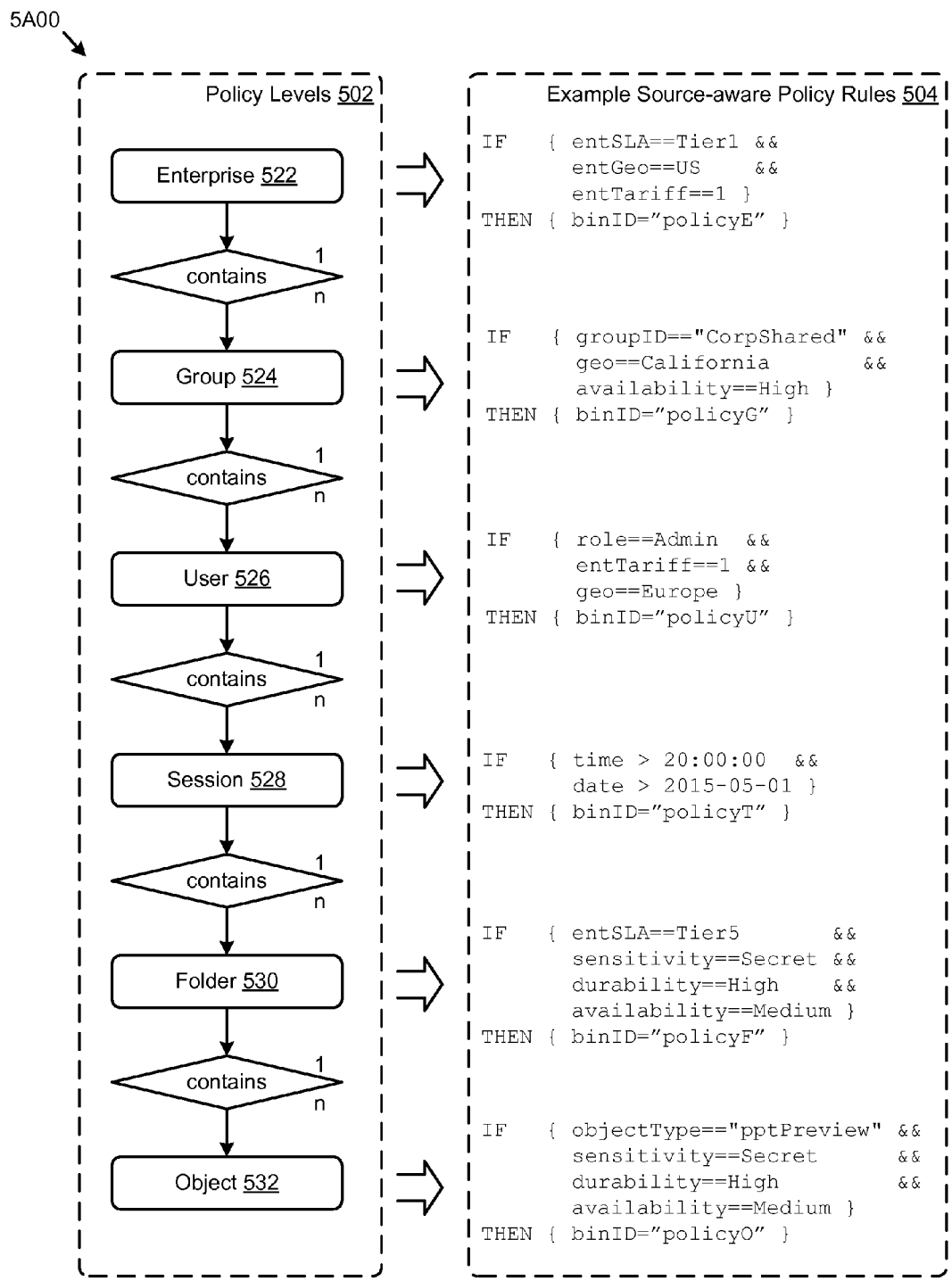
FIG. 5A and FIG. 5B are a diagrammatic representations of source-aware rule hierarchies as used in systems that access multiple content storage facilities using source-aware storage policies, according to an embodiment.

FIG. 5A is a diagrammatic representation of a source-aware rule hierarchy 5A00 as used in systems that access multiple content storage facilities using source-aware storage policies. As an option, one or more instances of the source-aware rule hierarchy 5A00 or any aspect thereof may be implemented in the context of the architecture and functionality of the embodiments described herein. Also, the source-aware rule hierarchy 5A00 or any aspect thereof may be implemented in any desired environment.

The source-aware rule hierarchy 5A00 is merely one embodiment and example of various source-aware policy rules and their relationships that can be used in the herein disclosed systems for accessing multiple content storage facilities using source-aware storage policies. Specifically, certain policy levels 502 and respective example source-aware policy rules 504 are shown. More specifically, the policy levels 502 show that the "Enterprise" can be the parent policy level (see entity 522) and have a one-to-many (e.g., 1:n) relationship with a "Group" policy level (see entity 524), which can, in turn, have a one-to-many relationship with a "User" policy level (see entity 526). For example, one enterprise (e.g., Company ABC) might have multiple groups (e.g., finance, engineering, etc.), and each group might comprise multiple users. Also, a given user can have a one-to-many relationship with a "Session" policy level (see entity 528). For example, the user might log in to an application (e.g., content management application 304) on Monday at 09:02 am to establish a first session, and then log in again on Tuesday at 02:32 pm to establish a second session. Further, in a given session, a user might work with various content folders having policies that are applied at a "Folder" policy level (see entity 530), and each folder might have multiple content objects (e.g., files) with associated policies at an "Object" policy level (see entity 532).

In one or more embodiments, each level in policy levels 502 can have one or more source-aware policy rules that are checked to dynamically determine the one or more policies to apply in executing storage commands invoked by a user according to the herein disclosed techniques and approaches. In some embodiments, the rules associated with lower levels in the policy hierarchy can override rules associated with higher levels. Specifically, the example source-aware policy rules 504 illustrate the conditional logic (e.g., operands, operators, results, etc.) that can be used to implement policy rules in systems for accessing multiple content storage facilities using source-aware storage policies. For example, at the "Enterprise" level, a policy rule might check enterprise-related source attributes (e.g., entSLA, entGeo, and entTariff) for certain respective conditions (e.g., Tier1, US, and 1), and if all are satisfied, then apply the policy binID="policyE". If a user (e.g., administrator from Europe) from the same enterprise logs into the application, then the "User" level policy rule will override the "Enterprise" rule, and the policy applied will be binID="policyU". Other policy rules at other policy levels are possible.

Figure 5B:
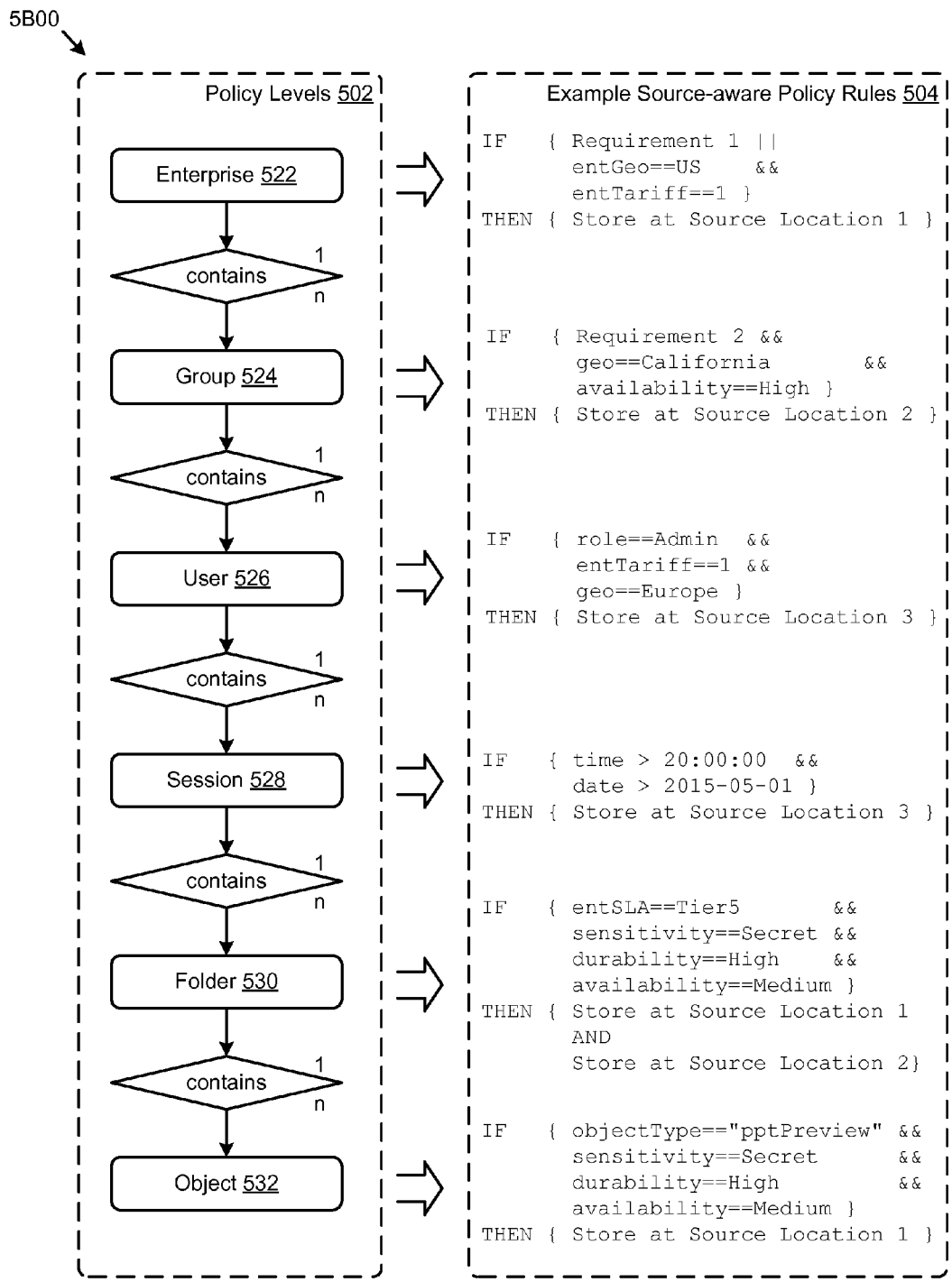

FIG. 5B is a diagrammatic representation of a source-aware rule hierarchy 5B00 as used in systems that access multiple content storage facilities using source-aware storage policies. As an option, one or more instances of the source-aware rule hierarchy 5B00 or any aspect thereof may be implemented in the context of the architecture and functionality of the embodiments described herein. Also, the source-aware rule hierarchy 5B00 or any aspect thereof may be implemented in any desired environment.

Figure 6:
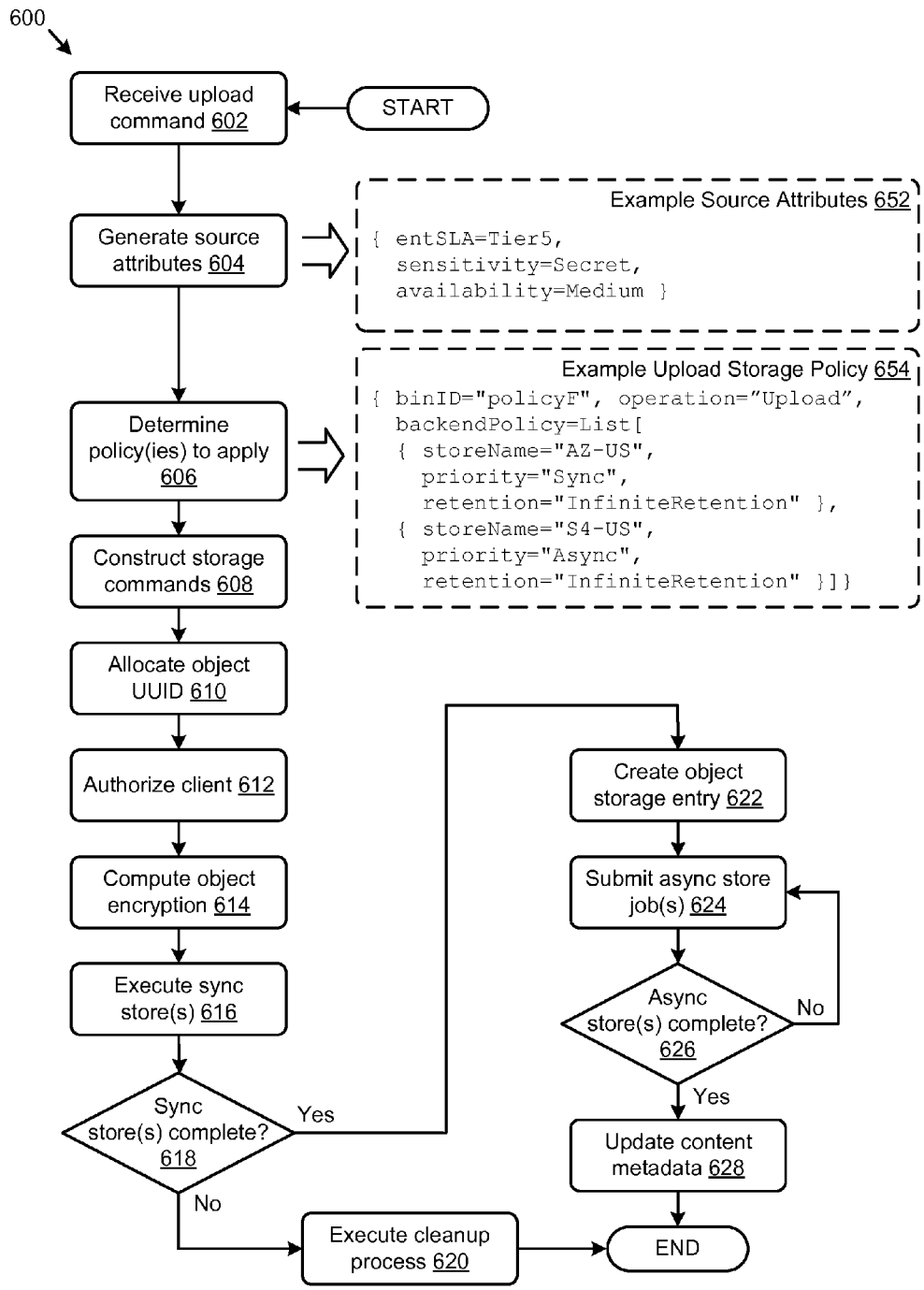
FIG. 6 is a flow diagram illustrating a content upload operation as used in systems that access multiple content storage facilities using source-aware storage policies, according to an embodiment.

In this embodiment, the source-aware policy rules specify one or more requirements and one or more target storage locations. For example, FIG. 6 is a flow diagram illustrating a content upload operation 600 as used in systems that access multiple content storage facilities using source-aware storage policies. As an option, one or more instances of content upload operation 600 or any aspect thereof may be implemented in the context of the architecture and functionality of the embodiments described herein. Also, the content upload operation 600 or any aspect thereof may be implemented in any desired environment.

The content upload operation 600 presents one embodiment of certain steps for uploading content (e.g., objects) in the herein disclosed systems that access multiple content storage facilities using source-aware storage policies. In one or more embodiments, the steps and underlying operations comprising the content upload operation 600 can be executed by the policy manager 180 in system 300. Certain example source attributes 652 and an example upload storage policy 654 are also shown for reference. Specifically, the content upload operation 600 starts with the policy manager 180 receiving an upload command (see step 602). The command and associated object or objects can be used with various other information (e.g., client profile metadata 344) to generate source attributes (see step 604), such as the example source attributes 652. The source attributes can then be used (e.g., as inputs to various policy rules) to determine one or more upload storage policies to apply to the upload (see step 606). For example, the source attributes and policy rules might indicate that the policy "policyF" should be applied. As shown in the example upload storage policy 654, policy "policyF" calls for a first priority synchronous store to "AZ-US" with infinite retention, and a second priority asynchronous store to "S4-US" with infinite retention. The policy manager 180 can then construct the storage commands required to execute the selected policy at the specified storage facilities (see step 608). In some embodiments, the policy manager 180 can allocate the UUID for the object (see step 610), authorize the client for accessing the storage facilities associated with the selected binID (see step 612), and compute the object signature and/or encryption (see step 614).

The policy manager 180 can then issue commands to execute the synchronous stores specified in the selected policy (see step 616). The synchronous stores are then checked for completion (see decision 618). If the synchronous stores do not complete successfully, a cleanup process is executed (see step 620) and the flow can return an error and end. When the synchronous stores successfully complete, an object storage entry (e.g., a row in the content storage metadata 345) is created (see step 622). Any asynchronous store jobs associated with the selected policy can then be submitted (see step 624). For example, the asynchronous jobs can be submitted to the queuing service 322 in the policy manager 180 for asynchronous execution. More specifically, in one or more embodiments, the queuing service 322 can use the capability of the policy manager 180 and the storage command API (e.g., see Table 1 and Table 2) to execute asynchronous replication stores (e.g., GET sync store object and PUT async store replication object). When the asynchronous stores are complete (see decision 626), the content storage metadata can be updated with the asynchronous store information (see step 628).

Figure 7:
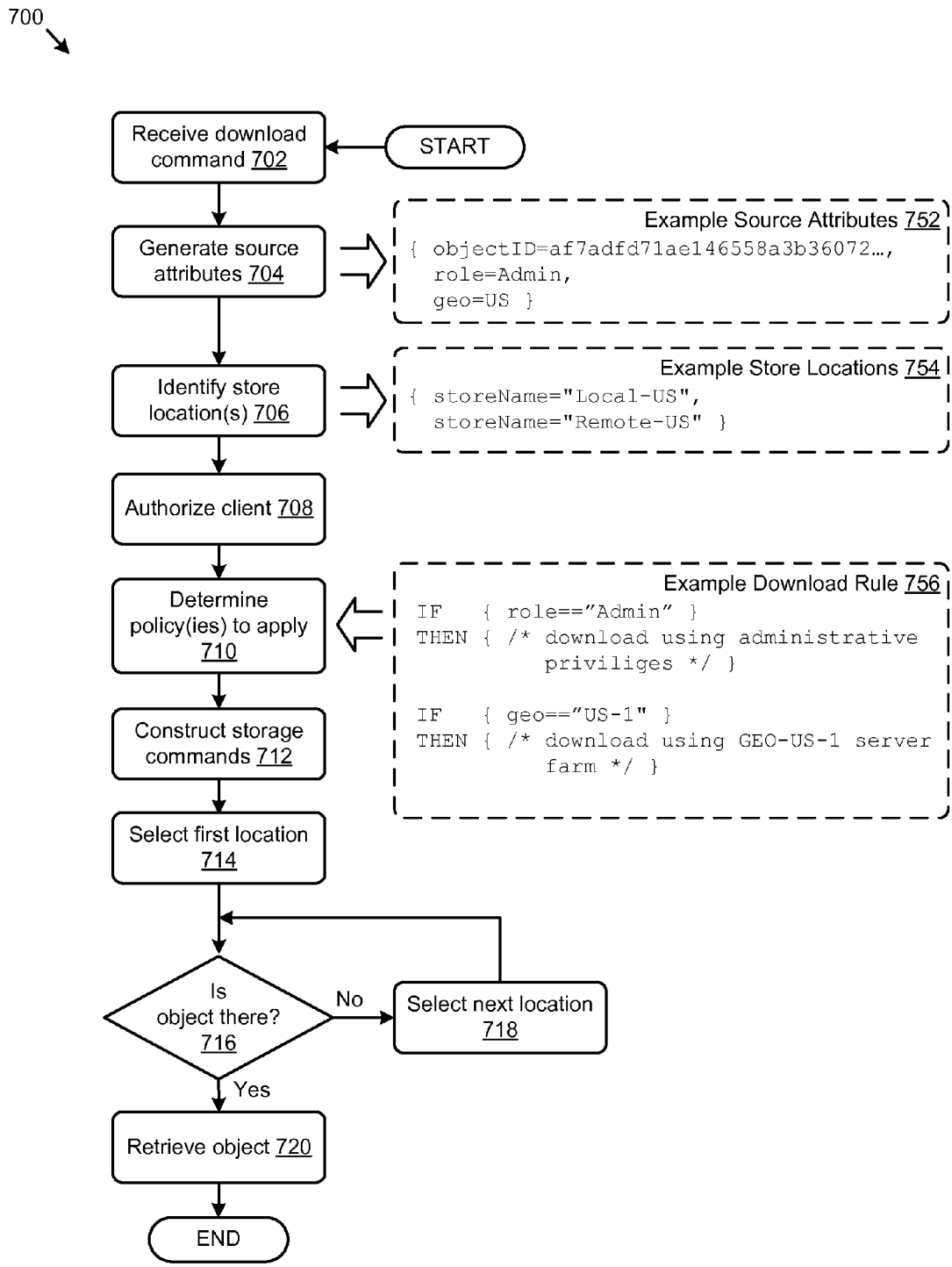
FIG. 7 is a flow diagram illustrating a content download operation as used in systems that access multiple content storage facilities using source-aware storage policies, according to an embodiment.

FIG. 7 is a flow diagram illustrating a content download operation 700 as used in systems that access multiple content storage facilities using source-aware storage policies. As an option, one or more instances of content download operation 700 or any aspect thereof may be implemented in the context of the architecture and functionality of the embodiments described herein. Also, the content download operation 700 or any aspect thereof may be implemented in any desired environment.

The content download operation 700 presents one embodiment of certain steps for downloading content (e.g., objects) in the herein disclosed systems that access multiple content storage facilities using source-aware storage policies. In one or more embodiments, the steps and underlying operations comprising the content download operation 700 can be executed by the policy manager 180 in system 300. Certain example source attributes 752, example store locations 754, and example download rules 756 are shown for reference. Specifically, the content download operation 700 starts with the policy manager 180 receiving a download command (see step 702). The command and associated object or objects can be used with various other information (e.g., an access key, items drawn from client profile metadata 344, etc.) to generate source attributes (see step 704) such as the example source attributes 752. The source attributes and access key can then be used to identify and access the various target storage locations for the object (see step 706). For example, the objectID in the example source attributes 752 can be used to query the content storage metadata 345 and determine the object is stored at "Local-US" and "Remote-US" as shown in the example store locations 754. The policy manager 180 can then authorize the client to access the identified storage locations (see step 708). Once authorized, the source attributes can be used (e.g., as inputs to various policy rules) to determine one or more download storage policies to apply to the download (see step 710). For example, as shown in the example download rule 756, if role=Admin, then the download should use administrative privileges. Since the example source attributes 752 indicate geo=US, the nearest location is storeName="Local-US". As another example, a download policy might indicate that all replications be checked for integrity at each download, or at every $100^{th}$ download, etc. The policy manager 180 can then construct the storage commands required to execute the selected policy (see step 712). The policy manager 180 can then select the first target storage location (see step 714) and check for the existence of the object (see decision 716). For example, the storage facility "Local-US" can be checked using the HEAD command. If the object is not there, the next location specified by the policy can be selected (see step 718) and the check repeated. If the object is confirmed to be in the selected location, the object can be retrieved (see step 720).

Figure 8:
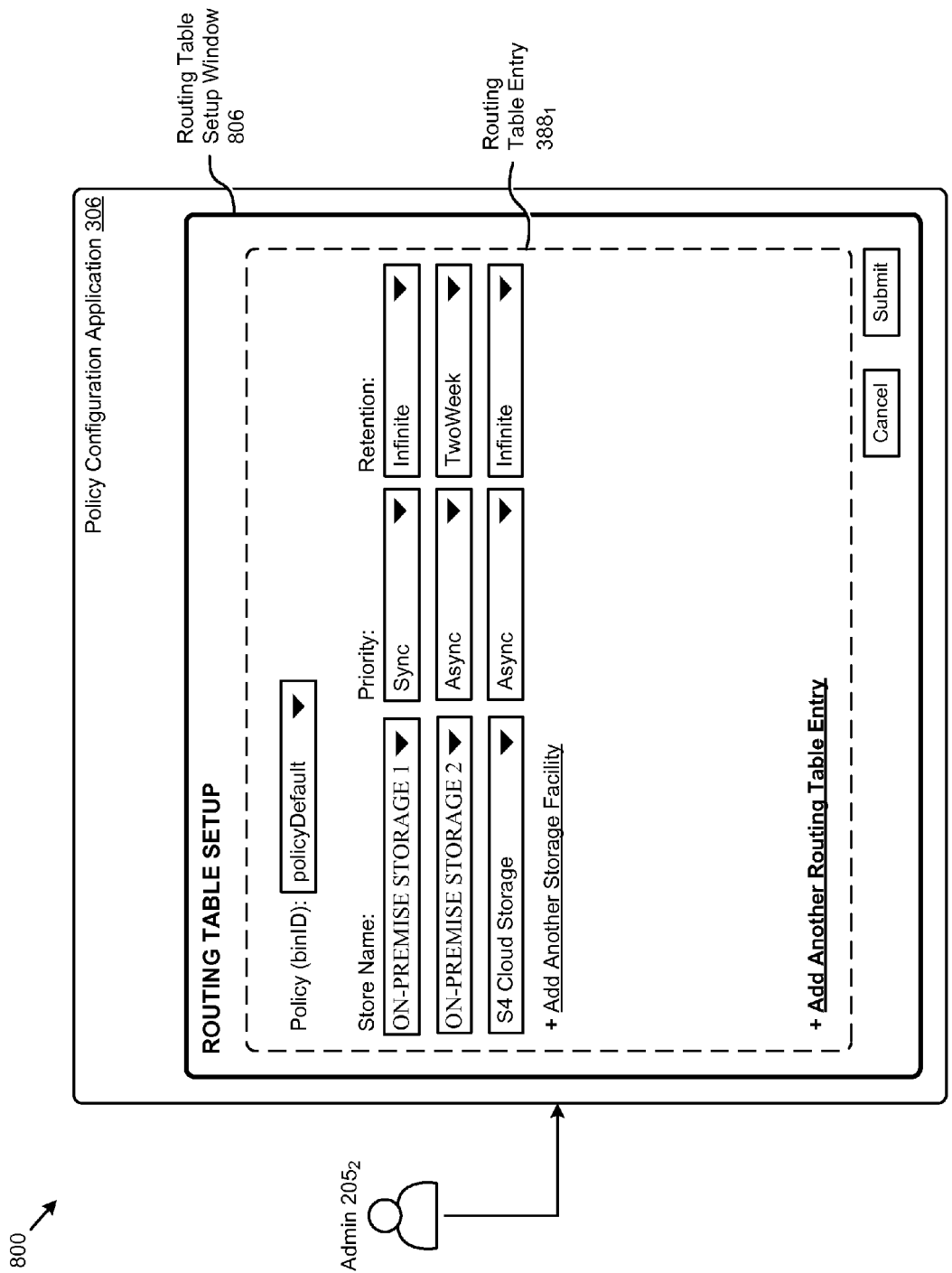
FIG. 8 exemplifies a policy routing user interface for specifying policy routing tables in systems for accessing multiple content storage facilities using source-aware storage policies, according to some embodiments.

FIG. 8 exemplifies a policy routing user interface 800 for specifying policy routing tables in systems for accessing multiple content storage facilities using source-aware storage policies. As an option, one or more instances of policy routing user interface 800 or any aspect thereof may be implemented in the context of the architecture and functionality of the embodiments described herein. Also, the policy routing user interface 800 or any aspect thereof may be implemented in any desired environment.

Specifically, the policy routing user interface 800 shown in FIG. 8 can be used by a user or an administrator $205_2$ to establish the routing table entries 388 that comprise the routing table metadata 343 as depicted in system 300. More specifically, the policy routing user interface 800 can comprise a routing table setup window 806 that is part of the policy configuration application 306. As shown, the routing table setup window 806 can present various input entry elements (e.g., dropdown selections, text boxes, etc.) through which the administrator $205_2$ can associate various storage facilities and storage facility attributes (e.g., Store Name, Priority, Retention, etc.) with a given policy. Such an association can comprise an instance of a routing table entry $388_1$ that can be stored in the routing table metadata 343. For example, the administrator $205_2$ can define a policy "policyDefault" having a first priority synchronous store to "ON-PREMISE STORAGE 1" with infinite retention, a second priority asynchronous store to "ON-PREMISE STORAGE 2" with a two-week retention, and a third priority asynchronous store to "S4 Cloud Storage" with infinite retention. In some embodiments, the selections can be from a list of available options (e.g., from the policy taxonomy metadata 348).

In some cases, multiple policies might apply in particular situation. In such cases, it is possible that there is a conflict among the multiple policies. One possible technique to resolve a conflict is to select the "first policy", or another possible technique to resolve a conflict is to select the "last policy". Yet another possible technique to resolve a conflict is to cascade or merge or intersect aspects of the policies and/or to apply heuristics to resolve policies or aspects thereto that are deemed to conflict. It is also possible to enter policies through a policy rules user interface that aids a user when entering policies such new policies that conflict with pre-existing policies are not stored unless a resolution technique is also specified.

Figure 9:
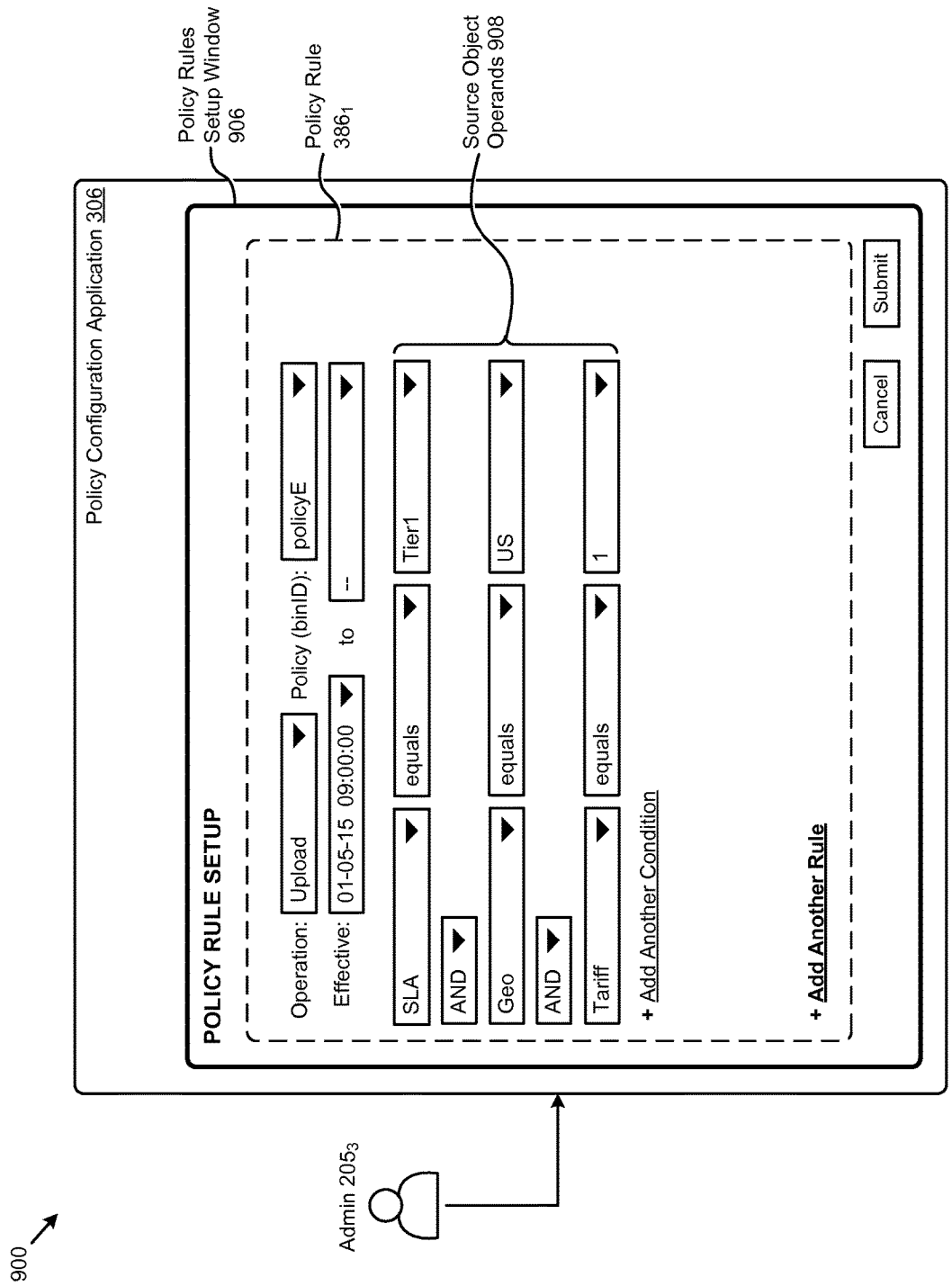
FIG. 9 exemplifies a policy rules user interface for specifying policy rules in systems for accessing multiple content storage facilities using source-aware storage policies, according to some embodiments.

FIG. 9 exemplifies a policy rules user interface 900 for specifying policy rules in systems for accessing multiple content storage facilities using source-aware storage policies. As an option, one or more instances of policy rules user interface 900 or any aspect thereof may be implemented in the context of the architecture and functionality of the embodiments described herein. Also, the policy rules user interface 900 or any aspect thereof may be implemented in any desired environment.

Specifically, the policy rules user interface 900 shown in FIG. 9 can be used by an administrator $205_3$ to establish the policy rules 386 that comprise the source-aware policy rule metadata 342 as depicted in system 300. More specifically, the policy rules user interface 900 can comprise a policy rules setup window 906 that is part of the policy configuration application 306. As shown, the policy rules setup window 906 can present various input entry elements (e.g., dropdown selections, text boxes, etc.) through which the administrator $205_3$ can associate various rules (e.g., conditional logic, etc.) and filters (e.g., Operation, Effective, etc.) with a given policy. Such an association can comprise an instance of a policy rule $386_1$ that includes one or more source object operands 908 (e.g., source object operand for "SLA", source object operand for "Geo", source object operand for "Tariff", etc.) that can be stored in the source-aware policy rule metadata 342. For example, the administrator $205_3$ can associate a policy "policyE" with an "Upload" storage operation, an effective time period starting on "01-05-15 09:00:00" and having no end, and a multi-part conditional logic (e.g., SLA=Tier1 & Geo=US & Tariff=1). When the all specified conditions are satisfied, the policy "policyE" can be selected. In some embodiments, the selections can be from a list of available options (e.g., from the policy taxonomy metadata 348).

Additional Embodiments of the Disclosure

Additional Practical Application Examples

Figure 10:
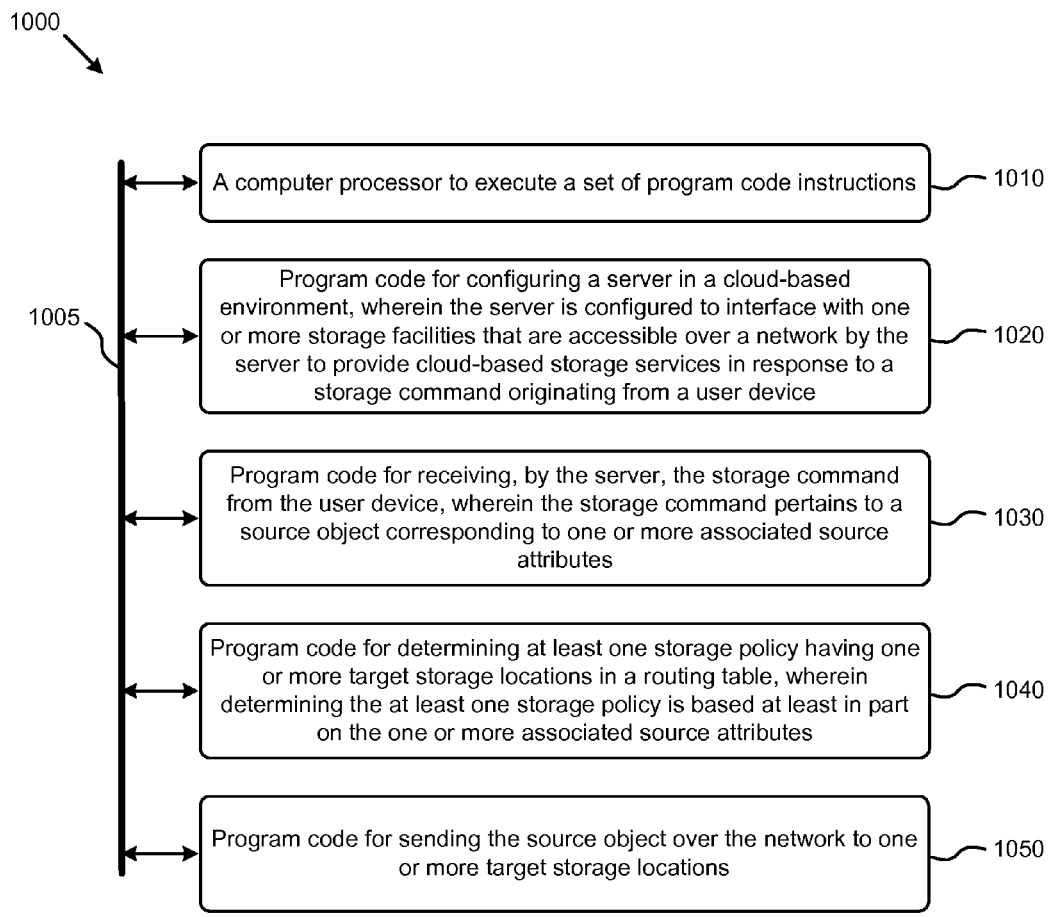
FIG. 10 depicts system components as arrangements of computing modules that are interconnected so as to implement certain of the herein-disclosed embodiments.

FIG. 10 depicts a system 1000 as an arrangement of computing modules that are interconnected so as to operate cooperatively to implement certain of the herein-disclosed embodiments. The partitioning of system 1000 is merely illustrative and other partitions are possible. As an option, the present system 1000 may be implemented in the context of the architecture and functionality of the embodiments described herein. Of course, however, the system 1000 or any operation therein may be carried out in any desired environment. The system 1000 comprises at least one processor and at least one memory, the memory serving to store program instructions corresponding to the operations of the system. As shown, an operation can be implemented in whole or in part using program instructions accessible by a module. The modules are connected to a communication path 1005, and any operation can communicate with other operations over communication path 1005. The modules of the system can, individually or in combination, perform method operations within system 1000. Any operations performed within system 1000 may be performed in any order unless as may be specified in the claims. The shown embodiment implements a portion of a computer system, presented as system 1000, comprising a computer processor to execute a set of program code instructions (see module 1010) and modules for accessing memory to hold program code instructions to perform: configuring a server in a cloud-based environment, wherein the server is configured to interface with one or more storage facilities that are accessible over a network by the server to provide cloud-based storage services in response to a storage command originating from a user device (see module 1020); receiving, by the server, the storage command from the user device, wherein the storage command pertains to a source object corresponding to one or more associated source attributes (see module 1030); determining at least one storage policy having one or more target storage locations in a routing table, wherein determining the at least one storage policy is based at least in part on the one or more associated source attributes (see module 1040); and sending the source object over the network to one or more target storage locations (see module 1050).

System Architecture Overview

Additional System Architecture Examples

Figure 11A:
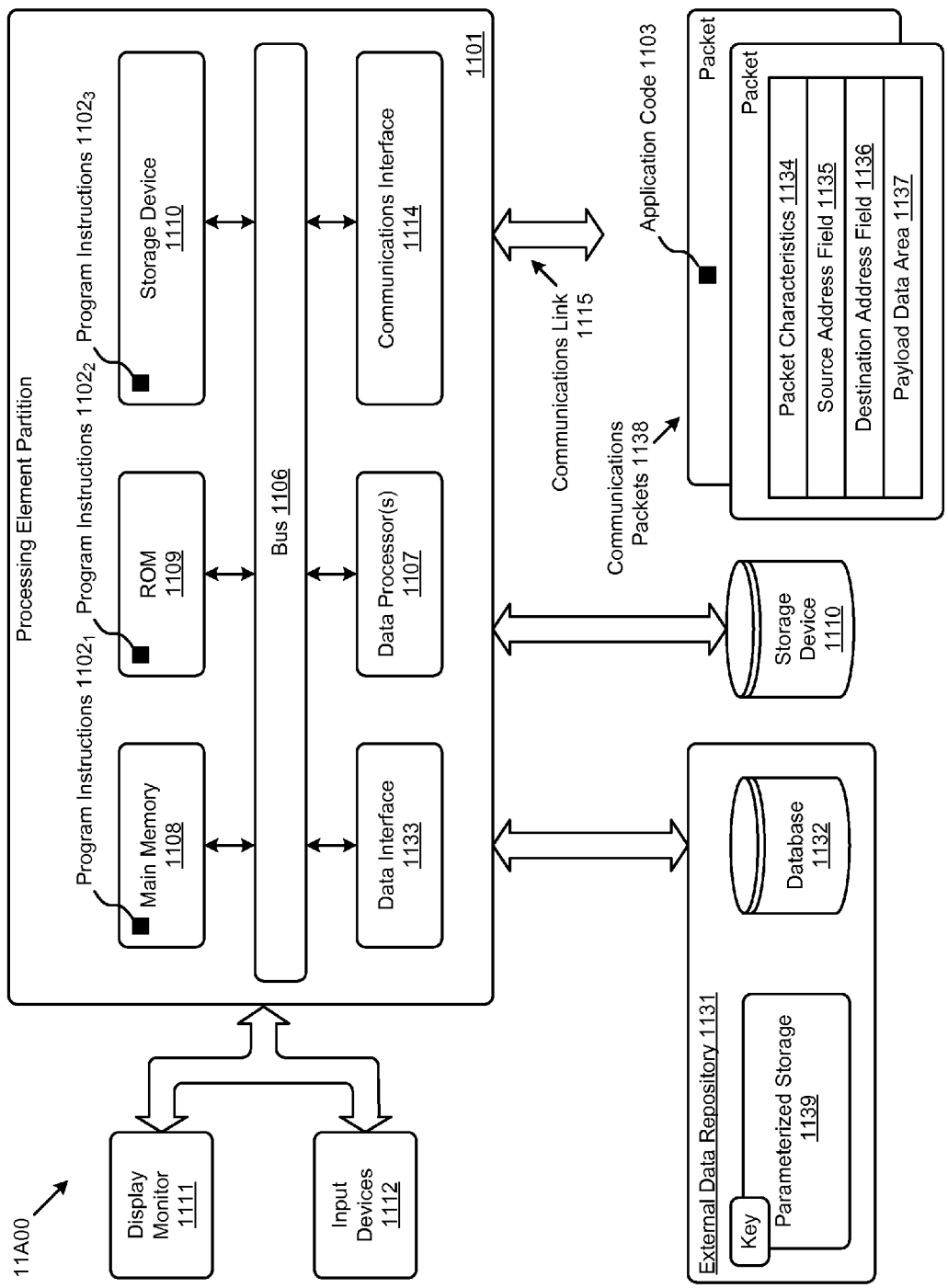
FIG. 11A and FIG. 11B depict exemplary architectures of components suitable for implementing embodiments of the present disclosure, and/or for use in the herein-described environments.

FIG. 11A depicts a block diagram of an instance of a computer system 11A00 suitable for implementing embodiments of the present disclosure. Computer system 11A00 includes a bus 1106 or other communication mechanism for communicating information. The bus interconnects subsystems and devices such as a CPU, or a multi-core CPU (e.g., data processor 1107), a system memory (e.g., main memory 1108, or an area of random access memory RAM), a non-volatile storage device or non-volatile storage area (e.g., ROM 1109), an internal or external storage device 1110 (e.g., magnetic or optical), a data interface 1133, a communications interface 1114 (e.g., PHY, MAC, Ethernet interface, modem, etc.). The aforementioned components are shown within processing element partition 1101, however other partitions are possible. The shown computer system 11A00 further comprises a display 1111 (e.g., CRT or LCD), various input devices 1112 (e.g., keyboard, cursor control), and an external data repository 1131.

According to an embodiment of the disclosure, computer system 11A00 performs specific operations by data processor 1107 executing one or more sequences of one or more program code instructions contained in a memory. Such instructions (e.g., program instructions $1102_1$, program instructions $1102_2$, program instructions $1102_3$, etc.) can be contained in or can be read into a storage location or memory from any computer readable/usable medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 11A00 performs specific networking operations using one or more instances of communications interface 1114. Instances of the communications interface 1114 may comprise one or more networking ports that are configurable (e.g., pertaining to speed, protocol, physical layer characteristics, media access characteristics, etc.) and any particular instance of the communications interface 1114 or port thereto can be configured differently from any other particular instance. Portions of a communication protocol can be carried out in whole or in part by any instance of the communications interface 1114, and data (e.g., packets, data structures, bit fields, etc.) can be positioned in storage locations within communications interface 1114, or within system memory, and such data can be accessed (e.g., using random access addressing, or using direct memory access DMA, etc.) by devices such as data processor 1107.

The communications link 1115 can be configured to transmit (e.g., send, receive, signal, etc.) any types of communications packets 1138 comprising any organization of data items. The data items can comprise a payload data area 1137, a destination address 1136 (e.g., a destination IP address), a source address 1135 (e.g., a source IP address), and can include various encodings or formatting of bit fields to populate the shown packet characteristics 1134. In some cases the packet characteristics include a version identifier, a packet or payload length, a traffic class, a flow label, etc. In some cases the payload data area 1137 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1107 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1131, which in turn can be formatted into any one or more storage areas, and which can comprise parameterized storage 1139 accessible by a key (e.g., filename, table name, block address, offset address, etc.).

Execution of the sequences of instructions to practice certain embodiments of the disclosure are performed by a single instance of the computer system 11A00. According to certain embodiments of the disclosure, two or more instances of computer system 11A00 coupled by a communications link 1115 (e.g., LAN, PTSN, or wireless network) may perform the sequence of instructions required to practice embodiments of the disclosure using two or more instances of components of computer system 11A00.

The computer system 11A00 may transmit and receive messages such as data and/or instructions organized into a data structure (e.g., communications packets 1138). The data structure can include program instructions (e.g., application code 1103), communicated through communications link 1115 and communications interface 1114. Received program code may be executed by data processor 1107 as it is received and/or stored in the shown storage device or in or upon any other non-volatile storage for later execution. Computer system 11A00 may communicate through a data interface 1133 to a database 1132 on an external data repository 1131. Data items in a database can be accessed using a primary key (e.g., a relational database primary key).

The processing element partition 1101 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1107. Some embodiments include one or more special-purpose hardware components (e.g., power control, logic, sensors, transducers, etc.). A module may include one or more state machines and/or combinational logic used to implement or facilitate the performance characteristics of techniques for accessing multiple content storage facilities using source-aware storage policies.

Various implementations of the database 1132 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of accessing multiple content storage facilities using source-aware storage policies). Such files or records can be brought into and/or stored in volatile or non-volatile memory.

Figure 11B:
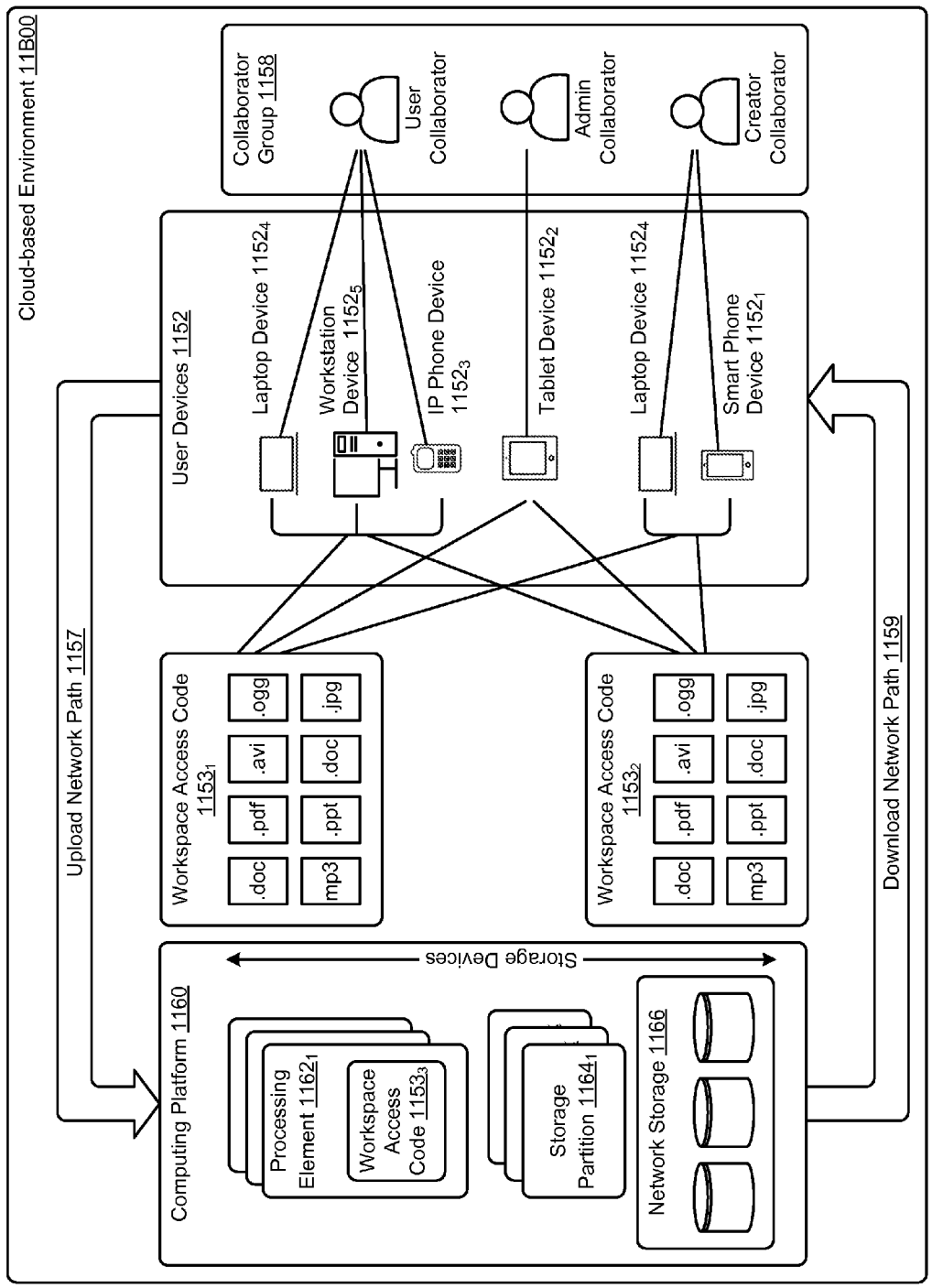

FIG. 11B depicts a block diagram of an instance of a cloud-based environment 11B00. Such a cloud-based environment supports access to workspaces through the execution of workspace access code (e.g., workspace access code $1153_1$ and workspace access code $1153_2$. Workspace access code can be executed on any of the shown user devices 1152 (e.g., laptop device $1152_4$, workstation device $1152_5$, IP phone device $1152_3$, tablet device $1152_2$, smart phone device $1152_1$, etc.). A group of users can form a collaborator group 1158, and a collaborator group can be comprised of any types or roles of users. For example, and as shown, a collaborator group can comprise a user collaborator, an administrator collaborator, a creator collaborator, etc. Any user can use any one or more of the user devices, and such user devices can be operated concurrently to provide multiple concurrent sessions and/or other techniques to access workspaces through the workspace access code.

A portion of workspace access code can reside in and be executed on any user device. Also, a portion of the workspace access code can reside in and be executed on any computing platform (e.g., computing platform 1160), including in a middleware setting. As shown, a portion of the workspace access code (e.g., workspace access code $1153_3$) resides in and can be executed on one or more processing elements (e.g., processing element $1162_1$). The workspace access code can interface with storage devices such the shown networked storage 1166. Storage of workspaces and/or any constituent files or objects, and/or any other code or scripts or data can be stored in any one or more storage partitions (e.g., storage partition $1164_1$). In some environments, a processing element includes forms of storage such as RAM and/or ROM and/or FLASH, and/or other forms of volatile and non-volatile storage.

A stored workspace can be populated via an upload (e.g., an upload from a user device to a processing element over an upload network path 1157). One or more constituents of a stored workspace can be delivered to a particular user and/or shared with other particular users via a download (e.g., a download from a processing element to a user device over a download network path 1159).

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings to be regarded in an illustrative sense rather than in a restrictive sense.

What is claimed is:

1. A method comprising:
   identifying one or more applications on one or more user devices;
   identifying one or more storage facilities that store or provide data on behalf of the one or more applications on the one or more user devices;
   configuring a server in a cloud-based environment, the server accessing at least one storage policy that is stored on the server that is located between the user device and the one or more storage facilities;
   generating, at the server, a dynamically-generated storage command that is associated with the at least one storage policy by using a storage command API, wherein generation of the dynamically-generated storage command comprises the steps of:
      receiving, from the one or more applications on the user device, a content storage command that pertains to a source object,
      determining a set of source attributes based at least on the content storage command and the source object,
      determining the at least one storage policy that applies to the source object after determining the set of source attributes, wherein the at least one storage policy is based at least in part on the one or more associated source attributes, and
      determining an operation from the storage command API to apply to the dynamically-generated storage command based at least in part on the at least one storage policy that was determined; and
   sending the source object over a network to the one or more storage facilities.

2. The method of claim 1, wherein the dynamically-generated storage command is based at least in part on a routing table having one or more target storage locations.

3. The method of claim 1, wherein determining the at least one storage policy is further based at least in part on conditional logic having at least one source object operand.

4. The method of claim 3, wherein the source object operand comprises at least one of, a service level agreement, a geographic indication, or a tariff, or a sensitivity indication, or a security objective, or a retention attribute, or a priority indication, or any combination thereof.

5. The method of claim 1, wherein the at least one storage policy is associated with an effective time period, wherein the at least one storage policy is valid during at least a portion of the effective time period.

6. The method of claim 1, wherein the at least one storage policy comprises at least one of, a user role, or a geography, or any combination thereof.

7. The method of claim 1, wherein the at least one storage policy is associated with a storage operation.

8. The method of claim 7, wherein the storage operation is at least one of, an upload operation, or a download operation, or any combination thereof.

9. The method of claim 1, wherein the one or more associated source attributes corresponding to a source object type or a source object identifier.

10. The method of claim 1, further comprising:
    maintaining a first table for generating content storage metadata, the first table comprising a first column that corresponds to a first identifier that is uniquely used to identify an object;
    maintaining a second table for describing a physical storage facility location associated with a portion of a storage policy, the second table comprising a first column that identifies a second identifier associated with an instance of a policy manager communicating with a storage facility;
    reducing a complexity of a storage command by associating the first column from the first table and the first column from the second table as a same global unique identifier.

11. A computer program product, embodied in a non-transitory computer readable medium, the non-transitory computer readable medium having stored thereon a sequence of instructions which, when executed by a processor causes the processor to execute a process, the process comprising:
   identifying one or more applications on one or more user devices;
   identifying one or more storage facilities that store or provide data on behalf of the one or more applications on the one or more user devices;
   configuring a server in a cloud-based environment, the server accessing at least one storage policy that is stored on the server that is located between the user device and the one or more storage facilities;
   generating, at the server, a dynamically-generated storage command that is associated with the at least one storage policy by using a storage command API, wherein generation of the dynamically-generated storage command comprises the steps of:
      receiving, from the one or more applications on the user device, a content storage command that pertains to a source object,
      determining a set of source attributes based at least on the content storage command and the source object,
      determining the at least one storage policy that applies to the source object after determining the set of source attributes, wherein the at least one storage policy is based at least in part on the one or more associated source attributes, and
      determining an operation from the storage command API to apply to the dynamically-generated storage command based at least in part on the at least one storage policy that was determined; and
   sending the source object over a network to the one or more storage facilities.

12. The computer program product of claim 11, wherein the dynamically-generated is based at least in part a routing table having one or more target storage locations.

13. The computer program product of claim 11, wherein the determining the least one storage policy is further based at least in part on conditional logic having at least one source object operand.

14. The computer program product of claim 13, wherein the source object operand comprises at least one of, a service level agreement, a geographic indication, or a tariff, or a sensitivity indication, or a security objective, or a retention attribute, or a priority indication, or any combination thereof.

15. The computer program product of claim 11, wherein the at least one storage policy is associated with an effective time period, wherein the at least one storage policy is valid during at least a portion of the effective time period.

16. The computer program product of claim 11, wherein the at least one storage policy comprises at least one of, a user role, or a geography, or any combination thereof.

17. The computer program product of claim 11, wherein the at least one storage policy is associated with a storage operation.

18. The computer program product of claim 17, wherein the storage operation is at least one of, an upload operation, or a download operation.

19. A system comprising:
   one or more applications on one or more user devices;
   one or more storage facilities that store or provide data on behalf of the one or more applications on the one or more user devices;
   a server in a cloud-based environment, the server the server accessing at least one storage policy that is stored on the server that is located between the user device and the one or more storage facilities;
   a policy manager to generate, at the server, a dynamically-generated storage command that is associated with the at least one storage policy by using a storage command API, wherein generation of the dynamically-generated storage command comprises the steps of:
      receiving from the one or more applications on the user device, a content storage command that pertains to a source object,
      determining a set of source attributes based at least in on the content storage command and the source object, and
      determining the at least one storage policy that applies to the source object after determining the set of source attributes;
   a request handler to determine the at least one storage policy that applies to the source object after generating the set of source attributes, wherein the at least one storage policy is based at least in part on the one or more associated source attributes, and determining an operation from the storage command API to apply to the dynamically-generated storage command based at least in part on the at least one storage policy that was determined; and
   a provider interface module to send the source object over a network to the one or more storage facilities.

20. The system of claim 19, wherein the least one storage policy is further based conditional logic having at least one source object operand.

* * * * *